(12) United States Patent
Debe et al.

(10) Patent No.: US 6,432,571 B1
(45) Date of Patent: Aug. 13, 2002

(54) MEMBRANE ELECTRODE ASSEMBLIES

(75) Inventors: Mark K. Debe, Stillwater; James M. Larson, Saint Paul; William V. Balsimo, Afton; Andrew J. Steinbach, Saint Paul, all of MN (US); Raymond J. Ziegler, Glenwood City, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/711,238

(22) Filed: Nov. 13, 2000

Related U.S. Application Data

(62) Division of application No. 09/208,695, filed on Dec. 10, 1998, now Pat. No. 6,183,668, which is a division of application No. 08/948,627, filed on Oct. 10, 1997, now Pat. No. 5,910,378.

(51) Int. Cl.[7] ................................................. H01M 4/86
(52) U.S. Cl. ............................ 429/41; 429/41; 429/42; 429/40; 429/30; 429/32; 429/35; 429/36; 29/623.3; 204/283; 204/296
(58) Field of Search ........................... 29/623.3; 429/30, 429/32, 35, 36, 40, 41, 42; 204/296, 283

(56) References Cited

U.S. PATENT DOCUMENTS

| | | |
|---|---|---|
| 3,442,715 A | 5/1969 | Yee et al. |
| 3,676,222 A | 7/1972 | Deibert |
| 4,215,183 A | 7/1980 | MacLeod |
| 4,259,209 A | 3/1981 | Nakane et al. |
| 4,550,123 A | 10/1985 | Lopatin et al. |

(List continued on next page.)

FOREIGN PATENT DOCUMENTS

| | | |
|---|---|---|
| CA | 1299936 | 5/1992 |
| EP | 0 577 291 A | 1/1994 |
| EP | 0 687 023 A | 12/1995 |
| EP | 0 869 568 A | 10/1998 |
| GB | 1100497 | 1/1958 |
| JP | HEI-SEI 6-68157 | 8/1994 |
| WO | WO 95/06002 | 2/1995 |
| WO | WO 97/20358 A | 6/1997 |

OTHER PUBLICATIONS

Acc. No. 88–144518/21 (Derwent Abstract).
Acc. No. 88–311503/44 (Derwent Abstract).
Acc. No. 88–317781/45 (Derwent Abstract).
Acc. No. 95–188591/25 (Derwent Abstract).
Acc. No. 95–218572/29 (Derwent Abstract).
Acc. No. 96–005215/01 (Derwent Abstract).

*Primary Examiner*—Bruce F. Bell
(74) *Attorney, Agent, or Firm*—Philip Y. Dahl

(57) ABSTRACT

Membrane electrode assemblies are described that include an ion conductive membrane a catalyst adjacent to the major surfaces of the ion conductive membrane and a porous particle filled polymer membrane adjacent to the ion conductive membrane. The catalyst can be disposed on the major surfaces of the ion conductive membrane. Preferably, the catalyst is disposed in nanostructures. The polymer film serving as the electrode backing layer preferably is processed by heating the particle loaded porous film to a temperature within about 20 degrees of the melting point of the polymer to decrease the Gurley value and the electrical resistivity. The MEAs can be produced in a continuous roll process. The MEAs can be used to produce fuel cells, electrolyzers and electrochemical reactors.

4 Claims, 19 Drawing Sheets

U.S. PATENT DOCUMENTS

| | | |
|---|---|---|
| 4,557,957 A | 12/1985 | Manniso |
| 4,654,281 A | 3/1987 | Anderman et al. |
| 4,720,400 A | 1/1988 | Manniso |
| 4,731,310 A | 3/1988 | Anderman et al. |
| 4,735,875 A | 4/1988 | Anderman et al. |
| 4,791,037 A | 12/1988 | Anderman |
| 4,812,352 A | 3/1989 | Debe |
| 4,826,554 A | 5/1989 | McIntyre et al. |
| 4,849,311 A | 7/1989 | Itoh et al. |
| 4,853,305 A | 8/1989 | Anderman et al. |
| 4,894,355 A | 1/1990 | Takeuchi et al. |
| 4,957,943 A | 9/1990 | McAllister et al. |
| 4,992,126 A | 2/1991 | Door |
| 5,143,805 A | 9/1992 | Anderman et al. |
| 5,162,167 A | 11/1992 | Minh et al. |
| 5,238,729 A | 8/1993 | Debe |
| 5,264,299 A | 11/1993 | Krasij et al. |
| 5,277,996 A | 1/1994 | Marchetti et al. |
| 5,308,465 A | 5/1994 | Hillrichs et al. |
| 5,316,871 A | 5/1994 | Swathirajan et al. |
| 5,336,558 A | 8/1994 | Debe |
| 5,338,430 A | 8/1994 | Parsonage et al. |
| 5,384,208 A | 1/1995 | Brand et al. |
| 5,395,705 A | 3/1995 | Door et al. |
| 5,399,184 A | 3/1995 | Harada |
| 5,429,886 A | 7/1995 | Struthers |
| 5,460,896 A | 10/1995 | Takada et al. |
| 5,472,799 A | 12/1995 | Watanabe |
| 5,501,915 A | 3/1996 | Hards et al. |
| 5,547,551 A | 8/1996 | Bahar et al. |
| 5,584,977 A | 12/1996 | Bachat et al. |
| 5,599,614 A | 2/1997 | Bahar et al. |
| 5,599,639 A | 2/1997 | Sansone et al. |
| 5,620,807 A | 4/1997 | Mussell et al. |
| 5,635,039 A | 6/1997 | Cisar et al. |
| 5,635,041 A | 6/1997 | Bahar et al. |
| 5,677,074 A | 10/1997 | Serpico et al. |
| 5,707,755 A | 1/1998 | Grot |
| 5,716,437 A | 2/1998 | Denton et al. |

MEMBRANE ELECTRODE ASSEMBLIES

This is a divisional of application Ser. No. 09/208,695 filed Dec. 10, 1998, now U.S. Pat. No. 6,183,668 which is a divisional U.S. application Ser. No. 08/948,627, filed on Oct. 10, 1997, issued as U.S. Pat. No. 5,910,378.

FIELD OF THE INVENTION

The invention relates to membrane electrode assemblies and electrochemical cells such as fuel cells, electrolyzers and electrochemical reactors.

BACKGROUND OF THE INVENTION

Fuel cells involve the electrochemical oxidation of a fuel and reduction of an oxidizing agent to produce an electrical current. The two chemical reactants, i.e., the fuel and the oxidizing agent, undergo redox reaction at two isolated electrodes, each containing a catalyst in contact with an electrolyte. An ion conduction element is located between the electrodes to prevent direct reaction of the two reactants and to conduct ions. Current collectors interface with the electrodes. The current collectors are porous so that reactants can reach the catalyst sites.

Fuel cells produce current as long as fuel and oxidant are supplied. If $H_2$ is the fuel, only heat and water are byproducts of the redox reactions in the fuel cell. Fuel cells have application wherever electricity generation is required. Furthermore, fuel cells are environmentally benign.

An electrolyzer involves the splitting of water into hydrogen and oxygen using electricity. Similarly, an electrochemical reactor, such as a chlor-alkali cell, uses electricity to produce chlorine from an alkaline brine. Electrolyzers and electrochemical reactors basically involve a fuel cell operating in reverse. For example, for an electrolyzer to produce hydrogen and oxygen from water by passing an electrical current through the device, an equivalent ion conductive element appropriate for use in a fuel cell may be located between catalyst layers and current collector layers.

SUMMARY OF THE INVENTION

In a first aspect, the invention features an electrochemical MEA comprising:
  an ion conductive membrane, the membrane having a first and second major surface;
  catalyst adjacent to the first and second major surfaces; and
  a porous, electrically conductive polymer film adjacent to the ion conductive membrane, the film comprising a polymer matrix and about 45 to about 98 percent by weight electrically conductive particles embedded within the polymer matrix.

In a preferred embodiment the Gurley value of the polymer film is less than about 50 s/50 cc. The polymer matrix can include a polymer selected from the group consisting of polyethylene, polypropylene, polyvinylidene fluoride, polytetrafluoroethylene, poly(tetrafluoroethylene-co-perfluoro-(propyl vinyl ether)) and mixtures thereof. The electrically conductive particles can comprise carbon. The porous polymer film preferably has an electrical resistivity of less than about 20 ohm-cm.

The catalytic material can be disposed at an interface between the ion conductive membrane and the porous, electrically conductive polymer film. The catalytic material can be disposed upon the surfaces of the ion conductive membrane. In preferred embodiments, the catalytic material is disposed in nanostructured elements.

In another aspect, the invention features an electrochemical MEA comprising:
  an ion conductive membrane, the membrane having a first and second major surface;
  catalyst adjacent to the first and second major surfaces; and
  a porous, electrically conductive polymer film adjacent to the ion conductive membrane, the film comprising electrically conductive particles and a porous matrix of fibrillated PTFE fibrils.

The catalytic material can be disposed at an interface between the ion exchange membrane and the porous, electrically conductive polymer film. The catalytic material can be disposed upon at least one major surface of the electrically conductive polymer film. The conductive particles can comprise carbon. The porous polymer film preferably has a Gurley value of less than 50 s/50 cc and an electrical resistivity of less than 20 ohm-cm.

In another aspect, the invention features a method of producing an electrically conductive polymer film comprising the step of heating a porous, polymer film comprising a polymer matrix and about 45 to about 98 percent by weight electrically conductive particles to a temperature within 20° C. of the melting point of the polymer matrix for sufficient time to decrease the Gurley value of the film by at least about 25 percent and decrease the electrical resistivity of the film by at least about 25 percent while substantially maintaining the physical integrity and mechanical properties of the film upon cooling. The polymer matrix can include a polymer selected from the group consisting of polyethylene, polypropylene, polyvinylidene fluoride, poly (tetrafluoroethylene-co-perfluoro-(propyl vinyl ether)) and mixtures thereof The is conductive particles can comprise carbon and/or one or more conductive metals. The porous film preferably includes between about 80 and about 98 percent by weight conductive particles. The temperature can range between about 5 to about 20 degree centigrade above the melting temperature. The Gurley value of the film following heating preferably is less than 50 s/50 cc. The method can further comprise the step of using differential cooling for quenching the extruded film to create an asymmetric film with one side being denser and having smaller pores and the other side being less dense and having larger pores. The differential cooling can be accomplished through the use of a casting wheel at a controlled temperature.

In another aspect, the invention features a method of forming an electrode backing layer for an electrochemical MEA comprising the steps of:
  (a) forming a polymeric film comprising a crystallizable polyolefin polymer matrix, conductive particles and a diluent for the polymer;
  (b) applying surface texture to the polymeric film; and
  (c) removing the oil before or after applying the surface texture.

In another aspect, the invention features a method of forming an electrochemical MEA comprising the step of placing an electrode backing layer on both sides of a polymeric ion conductive membrane, the electrode backing layers each comprising a gas permeable, electrically conductive porous film prepared as described in the preceding paragraph, wherein a catalyst layer is disposed between each of the ion conductive membrane and the electrode backing layers.

In another aspect, the invention features a method of forming an electrochemical MEA comprising the step of placing an electrode backing layer on both sides of a polymeric ion conductive membrane, the electrode backing layers each comprising a gas permeable, electrically conductive porous fibrillated PTFE film and conductive particles embedded in the film, wherein a catalyst layer is disposed between each of the ion conductive membrane and the electrode backing layers.

In another aspect, the invention features a method of producing a plurality of 5-layer MEAs, comprising the step of applying catalyst layers and electrode backing layers at suitable locations along a web of ion conduction membrane such that a plurality of 5-layer MEAs can be cut from the web of ion conduction membrane.

In another aspect, the invention features a film comprising greater than about 45 percent by weight conducting particles, the film having a surface exhibiting under contact with water a receding and advancing contact angles greater than 90°, wherein the advancing contact angle is no more than 50° greater than the receding contact angle. The advancing contact angle preferably is no more than 30° greater than the receding contact angle, more preferably no more than 20° greater than the receding contact angle.

In another aspect, the invention features a method of producing a film comprising a polymer and greater than about 45 percent by weight conducting particles, the method comprising the steps of heating to a temperature from about the melting point to about 20° degrees C. above the melting point and then stretching the film from about 25 percent to about 150 percent of their original length.

In another aspect, the invention features a polymer web including a plurality of MEA elements. The NEA elements can be disposed along a continuous web of ion conducting polymeric material. The polymer web can further include nanostructured catalyst layers and/or suitably located seal material.

Electrode backing layers as described herein have high electrical conductivity, high gas permeability, good water management characteristics and significant production advantages. Membrane electrode assemblies (MEAs) incorporating the electrode backing layers can have improved performance as determined by the current produced at a given fuel cell voltage. Advantageously, films of the present invention exhibit adequate hydrophobicity for effective water management without incurring the expense or the need for a fluoropolymer coating, whose properties can change with use. The porous polymeric, electrode backing layers can be used in efficient, commercial production methods of multilayer MEAs including continuous roll processes. Continuous roll processing allows for the cost effective assembly of hundreds of electrochemical cell components at a relatively rapid rate.

Other features and advantages of the invention will be apparent from the following description of the preferred embodiments thereof, and from the claims.

DESCRIPTION OF THE PREFERRED EMBODIMENTS

A. Electrochemical Cell Structure

Figure 1:
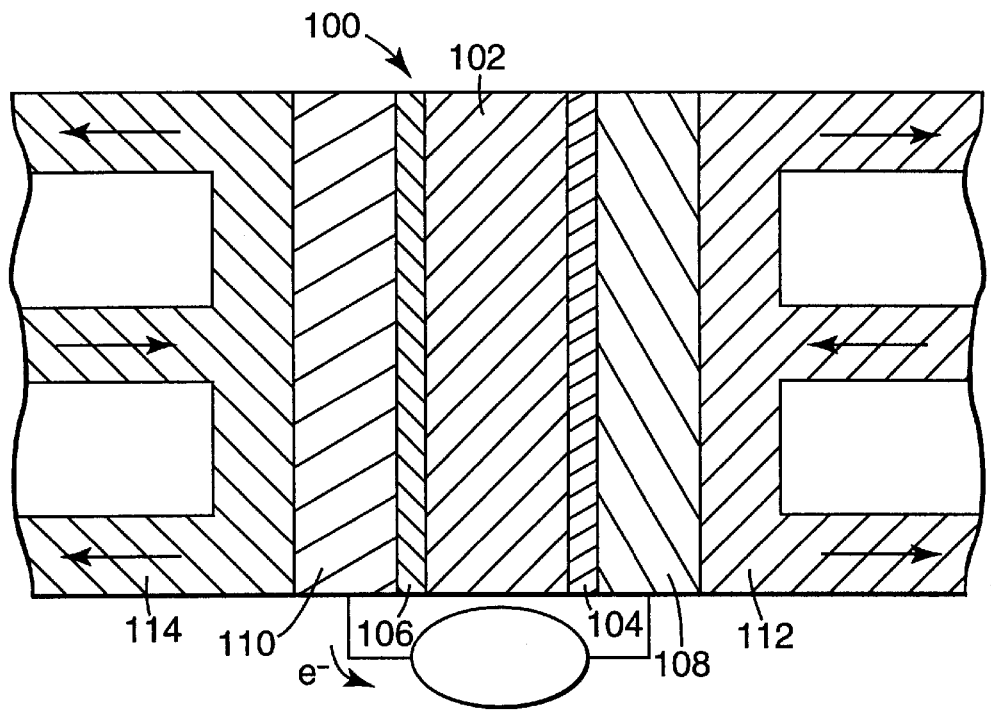
FIG. 1 is a schematic cross section of a five layer MEA.

Referring to FIG. 1, membrane electrode assembly (MEA) 100 in a five layer embodiment has various layers for the electrochemical oxidation of a fuel and reduction of an oxidizing agent to produce electric current. An ion conductive membrane 102 separates the cathode 104 and anode 106 of MEA 100. Each side of ion conductive membrane 102 contacts a catalyst layer, i.e., cathode 104 and anode 106. Catalyst layers 104, 106 each contact an electrode backing layer 108, 110. Electrode backing layers 108, 110 respectively contact bipolar plates 112, 114. The shape and size of the components of the electrochemical cell can vary over a wide range depending on particular design. FIG. 1 depicts the flow of reactants for a fuel cell. In electrolyzers and electrochemical reactors, a voltage is applied to the MEA to decompose a composition flowed to the electrodes, for example for the formation of $Cl_2$. The discussion below focuses on fuel cells, although the analogy to electrolyzers and electrochemical reactors is straightforward.

The ion conductive membrane provides ionic conductivity between the anode and cathode and forms a gaseous barrier blocking flow of the reactants. In some embodiments, the ion conductive membrane may be conductive only of ions either of positive charge or negative charge, i.e., either a cation exchange membrane or an anion exchange membrane, or only of one type of ion, e.g., a proton exchange membrane.

While being conductive of some type of ions, the ion conductive membrane should be nonconductive with respect to electrons and gaseous reactants. To prevent the passage of gaseous reactants, the ion conductive membrane should have sufficient thickness for mechanical stability and should be effectively nonpermeable. The conduction of gaseous reactants through the ion exchange membrane could result in the undesirable direct reaction of the reactants. Similarly, the conduction of electrons through the ion conductive membrane could result in an undesirable short circuit of the cell. Therefore, materials used in producing the ion conductive membrane should not conduct electrons. In the case of direct reaction of the reactants or of a short circuit, the energy released by the reaction of the fuel and oxidizing agent cannot be used to produce electricity.

The ion conductive membrane can include a polymer electrolyte. The polymers should be chemically stable and compatible with the catalysts so that the catalyst is not poisoned. Polymer electrolytes can be made from a variety of polymers including, for example, polyethylene oxide, poly (ethylene succinate), poly (β-propiolactone), and sulfonated fluoropolymers such as Nafion™ (commercially available from DuPont Chemicals, Wilmington, Del.). Nafion™ is produced by hydrolyzing a copolymer of polytetrafluoroethylene with perfluorosulfonylethoxyvinylether and converting its sulfonyl radical to a sulfonic radical. A suitable cation exchange membrane is described in U.S. Pat. No. 5,399,184, incorporated herein by reference.

Alternatively, the ion conductive membrane can be an expanded membrane with a porous microstructure where an ion exchange material impregnates the membrane effectively filling the interior volume of the membrane. U.S. Pat. No. 5,635,041, incorporated herein by reference, describes such a membrane formed from expanded polytetrafluoroethylene (PTFE). The expanded PTFE membrane has a microstructure of nodes interconnected by fibrils. Similar structures are described in U.S. Pat. No. 4,849,311, incorporated herein by reference.

The half-cell reactions of the fuel and the oxidizing agent take place at separate catalyst surfaces. The reactant gases, i.e., fuel and oxidizing agent, must be able to penetrate to their respective catalyst layer. A catalyst generally is in the form of particles disposed in a layer with an ionomer or electrolyte, in intimate contact with the ion conductive membrane and the electrode backing layer. The catalyst layer can be applied to the ion conductive membrane or the electrode backing layer by various methods. In other words, the catalyst can be applied to the surface of the ion conductive membrane and/or to a surface of the electrode backing layer. Alternatively, the catalyst layer can be encapsulated or embedded in the surface of the ion conductive membrane.

For example, the ion conductive membrane can include a nanostructured catalyst layer such as the membranes described in U.S. Pat. No. 5,338,430, incorporated herein by reference. The nanostructured films have a plurality of nanostructured elements that are either two-component whiskers coated with catalytically active material or one component structures including catalytically active material. The nanostructured elements can be embedded in an encapsulant such as a solid electrolyte, an ion exchange membrane, or other polymeric matrix. The production of nanostructured membranes is described in U.S. Pat. No. 5,238,729, incorporated herein by reference.

Appropriate catalysts for fuel cells generally depend on the reactants selected. Suitable catalyst materials for oxidation of hydrogen or methanol fuels include metals such as, for example, Pd, Pt, Ru, Rh and alloys thereof. Commonly used catalysts for oxygen reduction include platinum supported on carbon particles. Different catalysts may be preferred for use in electrolyzers and electrochemical reactors. For example, for oxygen evolution in an electrolyzer, a mixture of Ru and Ir oxides generally show better performance than Pt.

The electrode backing layer functions as a current collector. The electrode backing layer is porous for the passage of gaseous reactants. To impart electrical conductivity, the electrode backing layer includes electrically conducting particles. If desired, the electrode backing layer can be textured. Detailed features of the electrode backing layer are described below.

Bipolar plates typically have channels and/or grooves in their surfaces that distribute fuel and oxidant to their respective catalyst electrodes. Typically, bipolar plates are highly electrically conductive and can be made from graphite and metals. The electrodes and electrode backing layers of the present invention generally can be used with any standard fuels including $H_2$ and reformed hydrocarbons such as methanol and gasoline, and standard oxidants including $O_2$ in air or in pure form.

Figures 2, 2A:
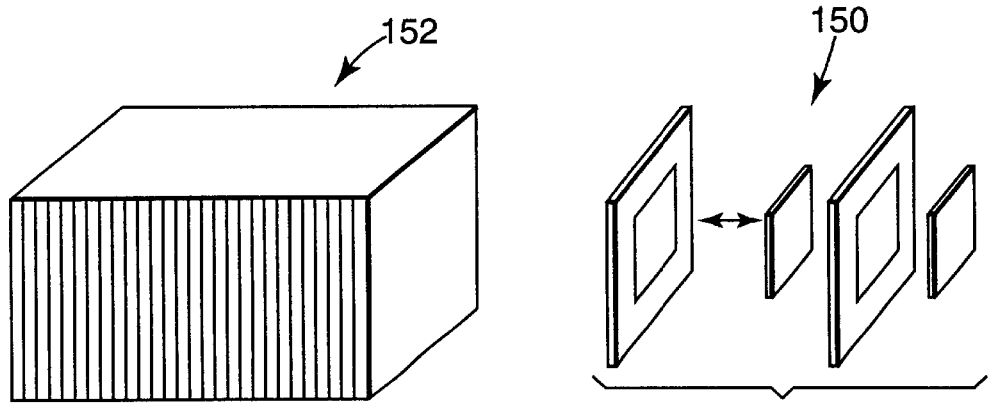
FIG. 2 is a schematic cross section of a fuel cell stack.

Generally, a plurality of fuel cells or MEAs 150 are combined to form a fuel cell stack 152 as depicted in FIG. 2. The cells within the stacks are connected in series by virtue of the bipolar plates such that the voltages of the individual fuel cells are additive. Further details relating to formation of a fuel cell stack are presented below.

B. Electrode Backing Layer Electrode

The electrode backing layer comprises a porous polymer film including a polymer binder and conductive particles. In general, the film should have a high loading of conductive particles held together by a relatively small portion of polymer matrix. The film generally has greater than about 45 percent by volume conductive particles and more preferably between about 65 percent and about 96 percent by volume conductive particles. In addition to the conductive particles, a catalyst layer (electrode) can be coated on a surface of the electrode backing layer.

The porosity of the polymer film forming the electrode backing layer provides for flow of reactants to the catalyst particles at the interface of the electrode backing layer and the ion conductive membrane. Preferred films have a porosity adequate to provide for an even flow of reactants while maintaining adequate electrical conductivity and mechanical strength of the film. Also, the porosity of the polymer film provides for water management within the cell. The electrode backing layer preferably is sufficiently porous to pass fuel gas and water vapor through it without providing a site for water condensation that would block the pores of the film and prevent vapor transport. The mean pore size generally ranges from about 0.01 micrometers to about 10.0 micrometers. Alternatively, porosity of the web can be quantified by the Gurley value of the web, that is, the amount of time needed for a given volume of gas to pass through a predetermined area of the web under a specified pressure drop, as described below. Suitable webs generally have Gurley values less than about 100 seconds per 10 cc.

To assist with water management, electrode backing layers with asymmetric porosity can be used. The electrode backing layer adjacent to the cathode, where water is formed, preferably has smaller pores adjacent to the cathode and larger pores at the outside of the MEA adjacent the bipolar plate. The higher pressure in the small pores tends to push the water away from the cathode. The formation of electrode backing layers having asymmetric porosity is described below.

Conductive particles can include a variety of conductive materials such as metals and carbon. The conductive particles can have a variety of shapes and sizes. Preferred conductive particles include, for example, conductive carbons. The conductive particles are preferably less than about 10 microns in diameter and more preferably less than about 1 micron in diameter. Suitable carbon particles include, for example, carbon black, graphite, carbon fibers, fullerenes and nanotubules. Preferred carbon particles include, for example, carbon blacks. Commercially available carbon blacks include, for example, Vulcan XC72RT™ (Cabot Corp., Bilerica, Mass.), Shawinigan C-55™ 50% compressed acetylene black (Chevron Chemical Co., Houston, Tex.), Norit type SX1™ (Norit Americas Inc., Atlanta, Ga.), Corax L™ and Corax P™ (Degussa Corp., Ridgefield Park, N.J.), Conductex 975™ (Colombian Chemical Co., Atlanta, Ga.), Super ST™ and Super P™ (MMM Carbon Div., MMM nv, Brussels, Belgium), KetJen Black EC 600JD™ (Akzo Nobel Chemicals, Inc., Chicago, Ill.). Useful graphite particles range in size up to about 50 $\mu$m in diameter, preferably from about 1 to about 15 $\mu$m. Suitable commercial graphites include, for example, MCMB 6-28™ (Osaka Gas Chemical Co., Osaka, Japan), and SFG 15™ (Alusuisse Lonza America Inc., now Timcal, Fair Lawn, N.J.). Conductive carbon black can have primary particles as small as about 10 nm to about 15 nm, though as sold they may be present in agglomerates as large as several mm. After dispersion, these agglomerates are broken down preferably into particles less than about 0.1 micron (100 nm). Mixtures of graphite and more conductive carbon blacks are also useful. Conductive carbon fibers useful in electrode backing materials of the invention include, e.g., those available from STREM Chemicals, Inc., Newburyport, Mass., catalog No. 06-0140, having lengths of approximately 6 mm and diameters of 0.001 cm.

In general, the polymer matrix can include any polymer that can be processed appropriately into a porous film loaded with particles. Suitable types of polymers include, for example, thermoplastic polymers, thermosensitive polymers and fluoropolymers. Two preferred processing methods are described below. These preferred processing methods provide additional constraints on the characteristics of the corresponding polymers.

In addition to the conductive particles, fillers can be used to alter the physical properties of the polymer films useful in the invention. Appropriate fillers include, e.g. silica ($SiO_2$), powdered polytetrafluoroethylene and graphite fluoride ($CF_n$). The polymer films preferably can include up to about 20 percent by weight fillers, and more preferably from about 2 to about 10 percent by weight fillers. The fillers are generally in the form of particles.

Preferably, the electrode backing layers have an electrical resistivity of less than about 20 Ohm-cm, more preferably less than about 10 Ohm-cm, and most preferably less than about 0.5 Ohm-cm. Also, films useful as electrodes in the invention preferably exhibit advancing and receding contact angles toward water of greater than about 90°, more preferably of greater than about 110° wherein the advancing contact angle is greater than the receding contact angle by less than about 50°, preferably less than about 30°, and more preferably less than about 20°. The measurement of the advancing and receding contact angles is described below. Receding and advancing-contact angles of water are an important measure of the hydrophobicity of the film surface and the ability of the film to function effectively in the water management of the fuel cell. The contact angles can be different on the two surfaces of the electrode backing layer. Similarly, the contact angles for the cathode and anode can be different.

The resistance to gas flow of a polymer film can be expressed in terms of the Gurley value. The Gurley value is a measure of the flow rate of a gas through a standardized area of the film under controlled pressure conditions, as described in ASTM D726-58, Method A, as described further below. The electrode backing layers preferably have a Gurley value of less than about 100 sec/50 cc air and more preferably less than about 50 sec/50 cc air.

The surfaces of the electrode backing layers can be microtextured possibly providing enhanced interfacial electrical conductivity, water management and flow field performance. For example, the material can be cast onto a textured casting wheel or can be embossed using a nip roll wherein one of the rolls is textured. A surface textured electrode backing layer can facilitate gas (e.g. fuel, oxygen, and/or water vapor) transport into and out of the fuel cell and channeling of liquid water away from the cathode.

Two processes for the production of preferred polymer films are described next.

1. TIPT Process

The first preferred process for the production of porous electrode backing layers involves thermally induced phase transition (TIPT). The TIPT process is based on the use of a polymer that is soluble in a diluent at an elevated temperature and insoluble in the diluent at a relatively lower temperature. The "phase transition" can involve a solid-liquid phase separation, a liquid-liquid phase separation or a liquid to gel phase transition. The "phase transition" need not involve a discontinuity in a thermodynamic variable.

Suitable polymers for the TIPT process include thermoplastic polymers, thermosensitive polymers and mixtures of polymers of these types, with the mixed polymers being compatible. Thermosensitive polymers such as ultrahigh molecular weight polyethylene (UHMWPE) cannot be melt-processed directly but can be melt processed in the presence of a diluent or plasticizer that lowers the viscosity sufficiently for melt processing. Suitable polymers may be either crystallizable or amorphous.

Suitable polymers include, for example, crystallizable vinyl polymers, condensation polymers and oxidation polymers. Representative crystallizable vinyl polymers include, for example, high and low density polyethylene; polypropylene; polybutadiene; polyacrylates such as polymethyl methacrylate; fluorine-containing polymers such as polyvinylidene fluoride; and corresponding copolymers. Condensation polymers include, for example, polyesters such as polyethylene terephthalate and polybutylene terethphalate; polyamides such as nylons; polycarbonates; and polysulfones. Oxidation polymers include, for example, polyphenylene oxide and polyether ketones. Other suitable polymers include the copolymer, poly(tetrafluoroethylene-co-perfluoro-(propyl vinyl ether)) sold as Teflon™ PFA (E. I. DuPont de Nemours Chemical Corp., Wilmington; Del.). Blends of polymers and copolymers may also be used. Preferred crystallizable polymers for electrode backing layers include polyolefins and fluoropolymers, because of their resistance to hydrolysis and oxidation.

Suitable diluents are liquids or solids at room temperature and liquids at the melting temperature of the polymer. Low molecular weight diluents are preferred since they can be extracted more readily than higher molecular weight diluents. Low to moderate molecular weight polymers, however, can be used as diluents if the diluent polymer and the matrix polymer are miscible in the melt state. Compounds with boiling points below the melting temperature of the polymer can be used as diluents by using a superatmospheric pressure sufficient to produce a liquid at the polymer melting temperature.

The compatibility of the diluent with the polymer can be evaluated by mixing the polymer while heating to determine whether a single liquid phase is formed, as indicated generally by existence of a clear homogeneous solution. An appropriate polymer dissolves or forms a single phase with the diluent at the melting temperature of the polymer but forms a continuous network on cooling to a temperature below the melting temperature of the polymer. The continuous network is either a separate phase from the diluent or a gel where the diluent acts as a plasticizer swelling the polymer network. The gel state may be considered a single phase.

For non-polar polymers, non-polar organic liquids generally are preferred as a diluent. Similarly, polar organic liquids generally are preferred with polar polymers. When blends of polymers are used, preferred diluents are compatible with each of the polymers. When the polymer is a block copolymer, the diluent preferably is compatible with each polymer block. Blends of two of more liquids can be used as the diluent as long as the polymer is soluble in the liquid blend at the melt temperature of the polymer, and a phase transition with the formation of a polymer network occurs upon cooling.

Various organic compounds are useful as a diluent, including compounds from the following broad classifications: aliphatic acids; aromatic acids; aliphatic alcohols; aromatic alcohols; cyclic alcohols; aldehydes; primary amines; secondary amines; aromatic amines; ethoxylated amines; diamines; amides; esters and diesters such as sebacates, phthalates, stearates, adipates and citrates; ethers; ketones; epoxy compounds such as epoxidized vegetable oils; phosphate esters such as tricresyl phosphate; various hydrocarbons such as eicosane, coumarin-indene resins and terpene resins, tall oil, linseed oil and blends such as petroleum oil including lubricating oils and fuel oils, hydrocarbon resin and asphalt; and various organic heterocyclic compounds.

Examples of particular blends of polymers and diluents that are useful in preparing suitable porous materials include polypropylene with aliphatic hydrocarbons such as mineral oil and mineral spirits, esters such as dioctyl phthalate and dibutyl phthalate, or ethers such as dibenzyl ether; ultrahigh molecular weight polyethylene with mineral oil or waxes; high density polyethylene with aliphatic hydrocarbons such as mineral oil, aliphatic ketones such as methyl nonyl ketone, or an ester such as dioctyl phthalate; low density polyethylene with aliphatic acids such as decanoic acid and oleic acid, or primary alcohols such as decyl alcohol; polypropylene-polyethylene copolymer with mineral oil; and polyvinylidene fluoride with dibutyl phthalate.

A particular combination of polymer and diluent may include more than one polymer and/or more than one diluent. Mineral oil and mineral spirits are each examples of a diluent being a mixture of compounds since they are typically blends of hydrocarbon liquids. Similarly, blends of liquids and solids also can serve as the diluent.

For thermoplastic polymers, the melt blend preferably includes from about 10 parts to about 80 parts by weight of the thermoplastic polymer and from about 90 to about 20 parts by weight of the diluent. Appropriate relative amounts of thermoplastic. polymer and diluent vary with each combination. For UHMWPE polymers, an example of a thermosensitive polymer, the melt blend preferably includes from about 2 parts to about 50 parts of polymer and from about 98 parts to about 50 parts by weight of diluent.

Figure 5:
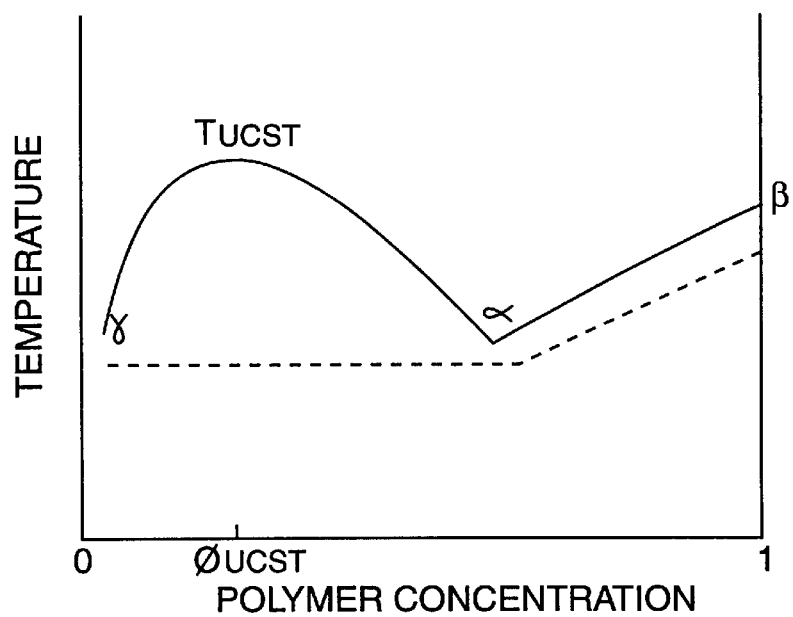
FIG. 5 is a graph depicting the phase behavior of a crystalline, thermoplastic polymer, useful for evaluating the proper conditions in the TIPT process.

For crystalline polymers the polymer concentration that can be used for a solid-liquid or liquid-liquid phase separation in a given system can be determined by reference to the temperature-composition graph for a polymer-diluent system, an example of which is set forth in FIG. 5. Such graphs can be readily developed as described in Smolders, van Aartsen and Steenbergen, *Kolloid-Zu Z. Polymere*, 243:14–20 (1971). Phase transitions can be located by determining the cloud point for a series of compositions at a sufficiently slow rate of cooling that the system stays near equilibrium.

Referring to FIG. 5, the portion of the curve from gamma to alpha represents the thermodynamic equilibrium liquid-liquid phase separation. $T_{ucst}$ represents the upper critical temperature of the systems. The portion of the curve from alpha to beta represents the equilibrium liquid-solid phase separation. The diluent can be chosen such that the crystallizable polymer and diluent system exhibits liquid-solid phase separation or liquid-liquid phase separation over the entire composition range.

$\Phi_{ucst}$ represents the critical composition. To form the desired porous polymers, the polymer concentration utilized for a particular system preferably is greater than $\Phi_{ucst}$. If the polymer concentration is below the critical concentration ($\Phi_{ucst}$) the phase separation, upon cooling, generally forms a continuous phase of diluent with dispersed or weakly associated polymer particles, and the resulting polymer composition typically lacks sufficient strength to be useful.

For a given cooling rate, the temperature-concentration curve of the diluent-polymer blend can be determined by Differential Scanning Calorimetry (DSC), for example, as indicated by the dashed line of FIG. 5 for one rate of cooling. The resulting plot of polymer concentration versus melting temperature shows the concentration ranges that result in solid-liquid (sloped portion of the dashed curve) and in liquid-liquid (horizontal portion of the dashed curve) phase separation. From this curve, the concentration ranges of the polymer and liquid that yield the desired porous structure can be estimated. The determination of the melting temperature-concentration curve by DSC is an-alternative to determination of the equilibrium temperature-composition curve for a crystalline polymer.

The above discussion of phase diagrams is applicable to amorphous polymers except that only liquid-liquid phase separation can be observed. In this case, a cloud point generally is indicative of the particular phase transition. Similarly, for gel forming polymers the phase transition of relevance involves a transition from a homogeneous solution to a gel. With gel forming polymers, an abrupt increase in viscosity is indicative of a phase transition from the melt to the gel, although a cloud point may also occur in some cases.

For many diluent-polymer systems, when the rate of cooling of the liquid-polymer solution is slow, liquid-liquid phase separation occurs at substantially the same time as the formation of a plurality of liquid droplets of substantially uniform size. When the cooling rate is slow enough such that the droplets form, the resultant porous polymer has a cellular microstructure. In contrast, if the rate of cooling of the liquid-polymer solution is rapid, the solution undergoes a spontaneous transformation called spinodal decomposition, and the resultant porous polymer has a fine, lacy structure with a qualitatively different morphology and physical properties than obtained following droplet formation, which can be obtained if the rate of cooling is slow. The fine porous structure is referred to as a lacy structure When liquid-solid phase separation occurs, the material has an internal structure characterized by a multiplicity of spaced, randomly disposed, non-uniform shaped, particles of polymer. Adjacent polymer particles throughout the material are separated from one another to provide the material with a network of interconnected micropores and being connected to each other by a plurality of fibrils consisting of the polymer. The fibrils elongate upon orientation providing greater spacing between the polymer particles and increased porosity. The filler particles reside in or are attached to the thermoplastic polymer of the formed structure.

In the case of ultrahigh molecular weight polyethylene (UHMWPE), the article obtained upon cooling may exist in a gel state. The nature of the underlying polymer network is affected by the rate of cooling. Fast cooling tends to promote gel formation while slower cooling tends to allow more crystallization to occur. Gel formation tends to dominate for compositions having diluen/UHMWPE weight ratios greater than 80:20, whereas crystallization dominates increasingly for diluent/UHMWPE weight ratios less than 80:20. The polymer network in the case of highly particle filled UHMWPE as determined by SEM, after extraction of the diluent, tends to be a fairly dense structure having fine pores. The structure of the network can be changed by the extraction process. The highly particle filled UHMWPE films are porous after extraction without need for restraint during extraction or stretching.

If desired, the polymer can be blended with certain additives that are soluble or dispersible in the polymer. When used, the additives are preferably less than about 10 percent by weight of the polymer component and more preferably less than about 2 percent by weight. Typical additives include, for example, antioxidants and viscosity modifiers.

The melt blend further includes particulates for incorporation into the electrode. For the resulting filled compositions, porous polymer films can be obtained by extraction of the diluent without physical restraint during extraction or stretching of the film. In some cases, restraint of the film during extraction may result in larger bubble points and smaller Gurley values than for a film extracted without restraint. Particles for the production of an electrode backing layer can include conductive particles. The particles can be a mixture of materials. The particles preferably form a dispersion in the diluent and are insoluble in the melt blend of polymer and diluent. The appropriate types of materials have been described above, as long as the materials are appropriately compatible with the polymer and diluent.

Some of the particulates, especially small sized carbon particles, can serve as nucleating agents. The nucleating agent can be a solid or gel at the crystallization temperature of the polymer. A wide variety of solid materials can be used as nucleating agents, depending on their size, crystal form, and other physical parameters. Smaller solid particles, e.g., in the submicron range, tend to function better as nucleating agents. Preferably, nucleating agents range in size from about 0.01 to about 0.1 $\mu$m and more preferably from about 0.01 to about 0.05 $\mu$m. Certain polymers such as polypropylene perform better in the TIPT process with a nucleating agent present.

In the presence of a nucleating agent, the number of sites at which crystallization is initiated is increased relative to the number in the absence of the nucleating agent. The resultant polymer particles have a reduced size. Moreover, the number of fibrils connecting the polymer particles per unit volume is increased. The tensile strength of the material is increased relative to porous films made without the nucleating agent.

In the porous networks, preferably the particles are uniformly distributed in the polymer matrix, and are firmly held in the polymeric matrix such that they do not wash out on subsequent extraction of the diluent using solvent. The average particle spacing depends on the volume loading of the particles in the polymer, and preferably, in the case of conductive particles, the particles are in sufficiently close proximity to sustain electrical conductivity. Processing of particles in the polymer matrix, particularly conductive carbon particles, requires care, since undermixing can result in poor dispersion, characterized by lumps of particles (e.g., knots of carbon), and overmixing can cause the agglomerates to disperse completely in the polymer. Conductive particle proximity is important for higher levels of conductivity. Therefore, both extremes are unfavorable for the conductive properties of the mixture.

The melt blend can contain as high as about 40 percent to about 50 percent by volume dispersed particles. By combining high diluent concentrations with high volume percent of particles, a high weight percent of particles can be achieved after the diluent has been extracted from the phase separated polymer composition. Preferably, the extracted and dried polymer material includes from about 50 percent to about 98 percent particles and more preferably from about 70 percent to about 98 percent by weight particles.

The diluent eventually is removed from the material to yield a particle-filled, substantially liquid-free, porous electrically-conductive polymeric material. The diluent may be removed by, for example, solvent extraction, sublimation, volatilization, or any other convenient method. Following removal of the diluent, the particle phase preferably remains entrapped to a level of at least about 90 percent, more preferably about 95 percent and most preferably about 99 percent, in the porous structure. In other words, few of the particles are removed when the diluent is eliminated, as evidenced by lack of particulates in the solvent washing vessel.

The process is described below generally and can be varied based on the teachings herein. In one embodiment of the TIPT process, the particles are disposed beneath the surface of the diluent, and entrapped air is removed from the mixture. A standard high speed shear mixer operating at several hundred RPM to several thousand RPM for about several minutes to about 60 minutes can be used to facilitate this step. Appropriate high speed shear mixers are made, for example, by Premier Mill Corp., Reading, Pa. and by Shar Inc., Fort Wayne, Ind.

If more dispersion is needed following the first mixing step, it can be achieved through milling of the dispersion before pumping the dispersion into the extruder, or through introduction of dispersing elements into the extruder. For shear sensitive polymers such as UHMWPE, most particulate dispersion preferably is done prior to pumping the dispersion into the extruder to minimize the shear needed in the extruder. If required, the second step involves dispersing the particles in the diluent and may include breaking down particle agglomerates to smaller agglomerates to eliminate large clumps within the diluent. Complete dispersion to primary particles generally is not necessary or desirable since contact or proximity between conducting particles generally promotes electrical conductivity.

The degree of preferred dispersion can be determined by inspection of the final electrode film for surface roughness and by determining its conductivity. The surface should be generally smooth and uniform with no protrusions through the surface large enough to be seen by eye. Insufficient dispersion of particulates can result in films having rough surfaces with a texture of fine to coarse sandpaper. In certain instances, no milling is needed since the shear used simply to wet out the particulates results in sufficient dispersion. Appropriate selection of components such as the diluent and the initial particles can greatly facilitate the dispersing step.

When additional dispersion is required or desired, the diluent containing the particulate material can be processed in a mill. Preferably, particle/diluent milling is carried out at relatively high viscosity where the milling process is more effective. Useful mills include, for example, attritors, horizontal bead mills and sand mills. Typically, a single pass through a horizontal bead mill at a moderate through-put rate (ie., moderate relative to the maximum through-put rate of the mill) is sufficient. When significant amounts of dispersion are required, milling times for recirculation of the dispersion through the mill of less than an hour may be sufficient in some cases, while milling times of at least about 4 to about 8 hours may be needed in other cases.

An example of an appropriate instrument for processing small batches is an attritor Model 6TSG-1-4, manufactured by Igarachi Kikai Seizo Co. Ltd., Tokyo, Japan. This attritor has a water-cooled with about a 1 liter volume which operates at about 1500 RPM with a capacity to process about 500 cc of material. For larger batches, appropriate instruments include horizontal mills such as those sold by Premier Mill Corp., Reading, Pa., in a variety of sizes.

Milling reduces agglomerates to smaller agglomerates or primary particles but generally does not break down primary particles to smaller particles. Filtration of the milled dispersion may be an optional step, if a greater number of larger particles are present than desired. An appropriate filter would be, for example, a model C3B4U 3 micron rope-wound filter made by Brunswick Technitics (Timonium, Md.) to remove agglomerated particles or particles larger than 3 microns, for example.

Filtering results in a more uniform article and allows metering of the dispersions under pressure by close tolerance gear pumps during the extrusion process without frequent breakdowns due to large particles clogging the pump. After filtering, the concentration of the particles can be determined, for example, using a Model DMA-4S Mettler/Paar density meter manufactured by Mettler-Toledo, Inc., Hightstown, N.J.

A dispersant can be added to the mixture of diluent and particles to aid in stabilizing the dispersion of particles in the diluent and in maintaining the particles as unaggregated. If a dispersant is used, the diluent-particle mixture preferably contains from about 1 percent to about 100 percent by weight of dispersant relative to the weight of the particles.

Anionic, cationic and nonionic dispersants can be used. Examples of useful dispersants include OLOA 1200™, a succinimide lubricating oil additive, available from Chevron Chemical Co., Houston, Tex., or the Hypermer™ series of dispersants, available from ICI Americas, Wilmington, Del.

The diluent-particle mixture generally is heated to about 150° C. to degas the mixture before pumping the mixture into an extruder. The mixture can be pumped into the extruder with or without cooling the mixture to ambient temperature. The polymer is fed typically into the feed zone of the extruder using a gravimetric or volumetric feeder. (In an alternative embodiment, at least some of the carbon is fed with the polymer into the extruder.) For thermoplastic polymers, feed and melt zone temperatures preferably are selected so that the polymer is at least partially melted before contacting diluent. If the particles are easily dispersed, the particles can be fed at a controlled rate into the extruder, and the diluent separately metered into the extruder. Also, a variety of in-line mixers are available that provide for dispersion of particulates on a continuous in-line basis from streams of particles and liquids. Alternatively, in cases where adequate dispersion can be obtained in the extruder, separate streams of polymer, diluent and conductive particles can be fed directly into the extruder.

Then, a melt blend of the diluent-particle mixture is formed with the polymer in the extruder. Following sufficient mixing in the extruder, the melt blend is cast into the desired form. Typically, since a film is desired, the melt blend is extruded onto a temperature-controlled casting wheel using a drop die. A twin-screw extruder is preferred.

Following formation of the desired shape of material, the material is cooled, preferably rapidly, to induce the phase transition. Quench conditions depend on film thickness, extrusion rate, polymer composition, polymer-to-diluent ratio, and desired film properties. Preferred conditions for a specific film can be readily determined. For higher quench temperatures, film strength may be diminished relative to films formed at lower quench temperatures. Rapid cooling can be accomplished by, for example, cooling in sufficiently cold air, cooling by contact on one or more sides with a temperature-controlled casting wheel or immersion of the material in a temperature-controlled liquid. Following quenching, the diluent is removed. If solvent is used to remove the diluent, remaining solvent is removed by evaporation.

For a given polymer-diluent combination, use of a casting wheel, especially a smooth casting wheel, can result in an asymmetric film. As the casting wheel temperature is lowered, it is increasing likely that the resulting film will be asymmetric. Typically, the side of the film toward the casting wheel has a "skin" that is denser and has smaller pores. Alternatively, a higher casting wheel temperature relative to the air temperature can result in a denser surface layer on the air side. In general, a lower casting wheel temperature produces a film that is stronger, denser on the casting wheel side, and has a smaller bubble point and higher Gurley value. Asymetric films can be produced by other asymmetric quenching methods.

2. Polymer-Fibrillation (PF) Process

The second preferred process for the formation of porous electrode backing layers involves the preparation of a porous web comprising conductive particles, such as carbon, metals, and the like, enmeshed in a fibril forming polymer. The process includes the formation of a mixture of the fibril forming polymer, a lubricant and insoluble nonswellable particles such as conductive carbon particles. The particles are approximately evenly distributed in the composite and are enmeshed in the fibril forming polymer. This process is adapted from the process outlined in U.S. Pat. Nos. 4,153,661, 4,460,642, 5,071,610, 5,113,860, and 5,147,539, which are incorporated herein by reference.

Preferred fibril forming polymers include halogenated vinyl polymers such as polytetrafluoroethylene (PTFE). Dry powder PTFE such as Teflon™ 6C can be used as the starting material. Alternatively, the process can be performed starting with a commercially-available aqueous dispersion of PTFE particles, such as Teflon 30™, Teflon 30™ and Teflon 42™ (E. I. DuPont de Nemours Chemical Corp., Wilmington, Del.), wherein water acts as a lubricant for subsequent processing. Commercially available PTFE aqueous dispersions may contain other ingredients such as surfactants and stabilizers, which promote continued suspension of the PTFE particles. In some applications, it is advantageous to remove the surfactant, if present, by extraction at a desired point in the process.

The lubricant must be selected such that the polymer is not soluble in the lubricant. Preferred lubricants include water, organic solvents and mixtures of water ad miscible organic solvents that can be conveniently removed by washing or drying. In some circumstances water has a deleterious effect on the added particles (i.e., causes unacceptable swelling or agglomeration) or inhibits dispersion of the particles. Suitable organic lubricants include, for example, alcohols, ketones, esters, ethers, and fluorinated fluids. Fluorinated fluids include, for example, perfluorinated compounds such as Flourinert™ (3M, Saint Paul, Minn.) or other competitive perfluorinated compositions. "Perfluorinated" is used to indicate that substantially all of the hydrogen atoms have been replaced by fluorine atoms. Electrode backing layers containing carbon particles preferably are prepared using a perfluorinated liquid lubricant. Preferably, the liquid used is Fluorinert FC-40™, although other liquids such as Fluorinert FC-5312™ can also be used. Alternatives also include Galden™ and Fomblin™ perfluorinated fluids (Ausimont USA, Thorofare, N.J.; Ausimont S.p.A., Montedison Group, Milan, Italy).

Preferred nonpolymer particles have a solubility of less than about 1.0 gram in 100 grams of lubricant at the mixing temperature. The particles can be but do not need to be absorbent or adsorbent with respect to the lubricant. The absorptive or adsorptive capability of the particles with respect to lubricant preferably is less than about 10 percent by weight and more preferably less than about 1 percent. The particles preferably have an average diameter less than about 200 microns, more preferably in the range from about 0.01 microns to about 100.0 microns and more preferably in the range from about 0.1 microns to about 10.0 microns. Generally, the nonpolymer particles are primarily or exclusively conductive particles such as conductive carbon particles. Due to the wetting properties of certain particles including conductive carbon particles, non-aqueous, organic lubricants are preferred when the particles are used in large quantities.

Small amounts of additives such as various particulate surface property modifiers can be added. Any additional additives should be inert under the conditions of operation of the fuel cell. Suitable additives include synthetic and natural polymers such as polyethylene and polypropylene.

For electrode backing layers formed by the FP process, the weight ratio of particles to polymer can be in the range from about 40:1 to about 1:4, preferably from about 25:1 to about 1:1, and more preferably from about 20:1 to about 10:1. The lubricant preferably is added in an amount exceeding the absorptive and adsorptive capability of the particles by at least about 3 percent by weight and below an amount at which the polymer mass loses its integrity, more preferably by at least about 5 weight percent and less than about 200 percent, even more preferably by at least about 25 percent and less than about 200 percent and yet even more preferably by at least 40 percent and less than about 150 percent. In one preferred embodiment, about 95 parts by weight of conductive particles is used with about 5 parts by weight of PTFE, and the weight ratio of inert fluid to solids (conductive particles plus PTFE) is about 8:1.

The absorptive capacity of the particles is exceeded when small amounts of lubricant can no longer be incorporated into the putty-like mass without separation of lubricant. A large viscosity change takes place corresponding to a transition from a paste to a slurry. An amount of lubricant exceeding the absorptive and adsorptive capacity of the particles should be maintained throughout the entire mixing operation. Since the void volume and porosity are controlled by the amount of lubricant used, the amount of lubricant can be varied in order to obtain electrode backing layers having a desired porosity and void volume. Generally, increasing the amount of lubricant increases void volume and mean pore size.

The mean pore size of the final article generally is in the range from about 0.01 micrometers to about 10.0 micrometers, and more preferably from about 0.1 micrometers to about 1.0 micrometers. With respect to distribution of pore size, preferably at least about 90 percent of the pores have a size less than 1 micrometer. The void volume as measured by Mercury Intrusion Porosity preferably ranges from about 10 percent to about 50 percent and more preferably from about 25 percent to about 35 percent. Typical Gurley values for webs of the invention range from about 2 seconds per 10 cc to about 100 seconds per 10 cc. Preferably, webs usefull in the invention exhibit a Gurley values of less than about 50 seconds per 10 cc and, more preferably less than about 40 seconds per 10 cc.

The resistivity of the final article generally is in the range from about 0.01 ohm-cm to about 10 ohm-cm, and more preferably from about 0.1 ohm-cm to about 2.0 ohm-cm.

To practice the PF process, the materials are blended together to form a soft dough-like mixture. If a solid powdered polymer is used, a low surface energy solvent, as described above, can be used to disperse the polymer into the mix. The blend is mixed at a temperature and for a time sufficient to cause initial fibrillation of the PTFE particles. The mixing temperature is selected to maintain the solvent in liquid form. The temperature preferably is in the range from about 0° C. and about 100° C., preferably from about 20° C. and about 60° C.

Initial fibrillation can take place simultaneously with the initial mixing of the ingredients. If additional mixing is needed, mixing times generally range from about 0.2 minutes to about 2 minutes to obtain initial fibrillation of the fibril forming polymer. Initial fibrillation generally is optimum within about 90 seconds after the point when all components have been fully incorporated together into a putty-like consistency. Mixing for shorter or longer times may produce a composite sheet with inferior properties. Preferably, mixing is ended after going through or reaching a viscosity maximum. This initial mixing causes partial disoriented fibrillation of the fibril forming polymer particles.

Devices useful for obtaining the necessary intensive mixing include commercially available mixing devices that sometimes are referred to as internal mixers, kneading mixers, double-blade batch mixers, intensive mixers and twin screw extruder compounding mixers. Preferred mixers of this type include sigma-blade mixers and sigma-arm mixers. Commercially available mixers of this type include those sold under the designations Banbury™ mixer (Farrel Corp., Ansonia, Conn.), Mogul mixer (Littelford Day Inc., Florence, Ky.), Brabender Prep™ mixer and Brabender™ sigma blade mixer (C. W. Brabender Instruments, Inc., South Hackensack, N.J.) and Ross™ mixers (AHing-Lander Co., Chesaire, Conn.).

Following mixing, the putty-like mass is transferred to a calendering device. The blend is subjected to repeated biaxial calendering between calendering rolls to cause additional fibrillation of the polymer. For typical lubricant/polymer combinations, the calendering rolls preferably are maintained at a temperature less than about 125°, more preferably at a temperature from about 0° C. to about 100° C. and even more preferably from about 20° C. to about 60° C. Lubricant lost to evaporation can be replaced between passes through the calender. During calendering, lubricant levels are maintained at least at a level exceeding the absorptive capacity of the solids by at least about 3 percent by weight, until sufficient fibrillation occurs to produce the desired void volume and porosity.

The calendering is repeated to form a self supporting tear resistant sheet. The gap between the calendering rolls generally is decreased with each successive pass. The material typically but not necessarily is folded and rotated 90° between passes through is the calender. The number of folds and gap settings can be adjusted to yield the desired properties of the resultant sheet. As the calendering is repeated, the tensile strength reaches a maximum beyond which additional calendering becomes deleterious. Calendering generally is stopped after the maximum tensile strength is reached and before the tensile strength deteriorates below the minimum acceptable tensile strength. Generally, about 10 to about 20 passes through the calendering rolls are appropriate. Once a web of the desired thickness has been obtained, it can be air-dried at room temperature or placed in a convection oven at an appropriate temperature in order to remove excess inert fluid. Webs preferably have a final thickness in the range of 0.1 to 1.0 mm, more preferably 0.2 to 0.5 mm, and even more preferably in the range of 0.25. to 0.4 mm.

The resultant electrode backing layer preferably has a tensile strength of at least about 1 megapascals and more preferably at least about 3 megapascals. The sheets are substantially uniformly porous with particles generally uniformly distributed in a polymer fibril matrix. Almost all of the particles are separated from each other yet the particles remain in sufficient proximity such that good electrical conductivity is obtained.

C. Additional Processing

It has been discovered that the performance characteristics of particle-loaded electrode backing layers, especially those produced with the TIPT process, can be significantly improved by additional processing once the polymer films are formed. First, the polymer electrode backing layer can be heated to a temperature near the melting point of the polymer matrix. The temperature preferably is in the range from about 20° C. above to about 20° C. below the melting point of the polymer matrix, more preferably at a temperature between the melting point and 10° C. above the melting point.

Preferably, the heating is performed for a period of time to heat the polymer electrode up to the target temperature and for polymer flow to occur. For laboratory evaluation, a period of about 10 minutes is sufficient to ensure that the film has equilibrated at the temperature of the oven and for polymer flow to occur. This period of time accommodates the inevitable loss of heat from an oven and time for the oven to equilibrate at its set point. For continuous in-line processing, much shorter residence times may be sufficient to allow enough time for heating to the target temperature and for polymer flow to occur. Surprisingly, this heating does not destroy the porosity of the film, even with the film being unrestrained during heating. This heating step significantly reduces the electrical resistance in the electrode backing layer while decreasing the Gurley and increasing the bubble point value.

In addition, the electrode backing layers can be stretched. Depending on the polymer, stretching generally can be carried out effectively at a temperature from room temperature to about 20° C. below the melting point of the polymer, as determined by DSC. For highly particle filled films, stretching is preferably carried out after extraction of the diluent at temperatures within plus or minus 20 degrees C. of the melting point of the polymer, as determined by DSC. Temperatures in this range would normally result in loss of porosity for unfilled films with the diluent extracted. While films normally are stretched after extraction of the diluent, it is also possible to stretch the films with the diluent present, in which case porosity may or may not develop.

For small scale evaluation work, a machine such as those made by T.M. Long Co. (Sommerville, N.J.) can be used. The film is inserted into the machine at the desired temperature and gripped by all four edges such that the film can be stretched in one direction (uniaxial) of both directions (biaxial). Biaxial stretching can be performed sequentially or simultaneously. For in-line processing, film can be stretched lengthwise using a device having a series of rollers that can be set to rotate at increasingly higher rpm. Stretching in the width direction can be accomplished by a device referred to as a tenter. A tenter can have several zones that can be heated to a desired temperature. Moving grips that ride on a rail through the tenter grab the film by the edges. The spacing between the two sets of grips on either side of the tenter can be increased as the film moves through the tenter to accomplish the desired degree of stretching. Available in-line equipment can be simultaneous biaxial stretching.

In general, bubble point increases and Gurley value decreases as the stretch ratio (the ratio of final film dimension to initial film dimension) increases, although an extremum frequently is reached such that higher stretch ratios result in a lower bubble point and higher Gurley value. The thickness of the film generally is reduced by stretching. In the case of conductive carbon particle-filled porous films, stretching has similar effects on bubble point and Gurley value as with unfilled films but also tends to increase the resistivity of the film. Careful optimization is needed to balance suitably the bubble point, Gurley value and resistivity. In contrast, stretching tends to reduce the resistivity of porous films loaded with metallic particles such as tungsten. Unstretched films containing high loadings of tungsten have high resistivity, which decreases as the stretch ratio is increased.

D. MEA Formation

The catalytic, electrode layer generally is formed as an integral part of either the ion conducting membrane or the electrode backing layer. In either case, an electrode backing layer is placed on each side of the ion conduction membrane with a catalyst layer between each electrode backing layer and ion conducting membrane to form the 5-layer MEA. The electrode backing layers and the ion conducting membrane must be held closely together in order to reduce resistance to ionic and/or electrical flow between the elements.

The elements can be held together by stack pressure, generally with a container ultimately applying the pressure. Preferably, the elements are laminated together. Lamination supplies the physical proximity, as an alternative to stack pressure. Surprisingly, the lamination step can be performed with particle-filled, porous polymer components without destroying the porous characteristic or structural integrity of the elements.

The lamination step should form cohesive association between the five layers of the MEA. Selection of appropriate conditions for the lamination is based on the specific materials used. Particular examples are described below in the Examples. Lamination conditions should not compromise membrane properties such as porosity, surface wetting and electrical resistance.

The objective of the lamination is to eliminate the physical gap between the layers. Cohesion or self-adhesion of polymers of the different layers can be promoted by increasing the total area of contact, thus increasing the probability of diffusional interlacing of polymer chains at the areas of contact. Some preferred polymer components described above are more compressible than typical polymer films. Increased compressibility makes pressure more effective in increasing contact area. Evidently, the particulate filler in the polymer, electrode backing layer helps to inhibit the collapse of the pores during the lamination.

Lamination can be accomplished in a variety of ways. These approaches include the use of heat lamination, pressure lamination or solvent lamination. Heat lamination and solvent lamination also can involve some addition of pressure. The appropriate methods for lamination depend on the materials.

Figure 3:
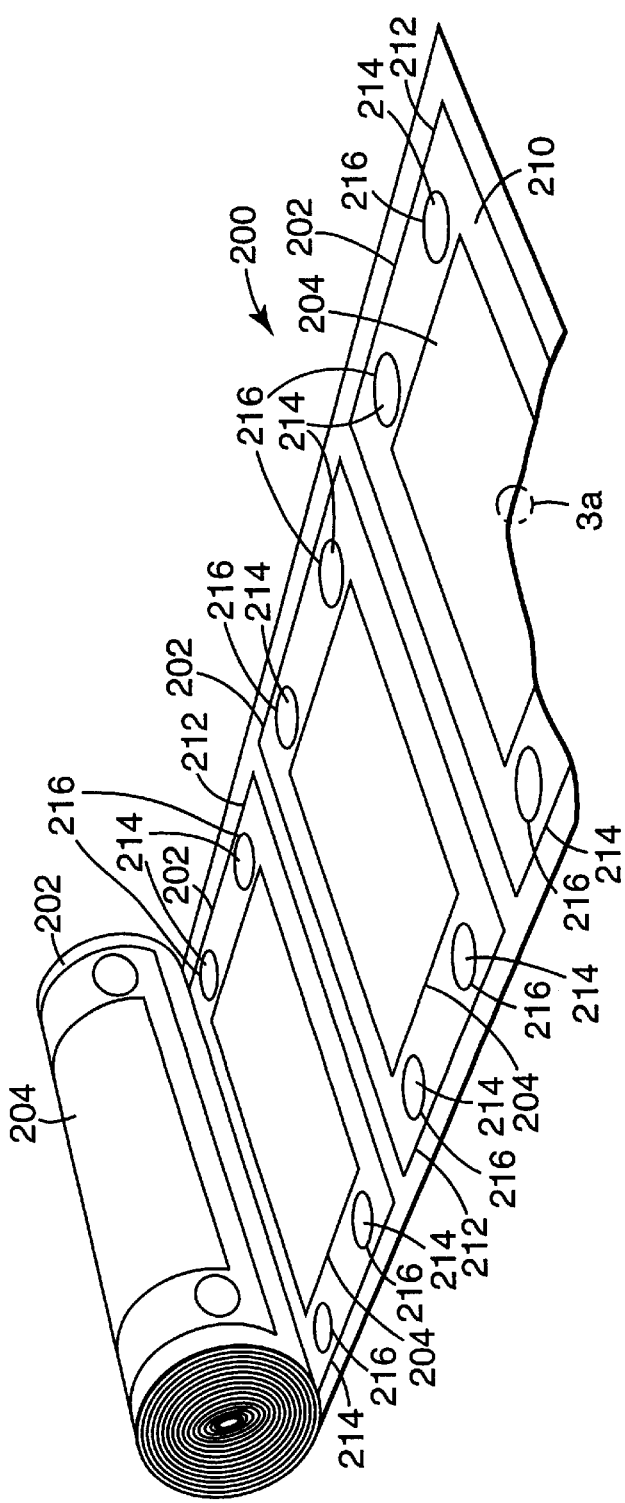
FIG. 3 is a perspective view of a continuous roll of MEAs.
Figure 3A:
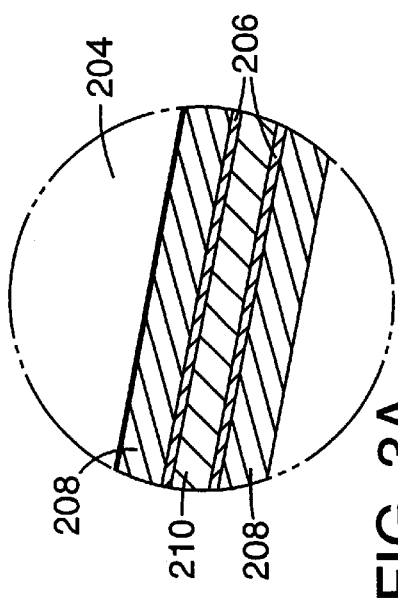

Continuous roll processing of the MEA greatly enhances the efficiency of fuel cell production. For example, the 5-layer MEA is fabricated as a continuous web 200 of identical repeating MEAs 202, i.e., as illustrated in FIG. 3. On the continuous web of MEAs 200, catalyst electrode areas 204, including catalyst layers 206 and electrode backing layers 208, can be applied patch-wise or continuously on each side to ion conduction membrane 210, supplied in roll form. Similarly, appropriate seals and gaskets 212, defined by the mating surfaces of the bi-polar plates, can be applied at the appropriate locations on roll membrane 210 adjacent catalyst electrode areas 204. Holes 214 are punched at appropriate locations at the center of seals or gaskets 216. The boundary between adjacent MEAs can be indicated for cutting or partially perforated for fast and easy separation during the stack assembly process. In addition, registration marks can be applied at the appropriate spots to facilitate robotic pick-up and alignment during the stack assembly process.

If catalyst layer 206 is associated with electrode backing layer 208, the combined layers can be attached or laminated to ion conduction membrane 210. Alternatively, catalyst layer 206 and electrode backing layer 208 can be associated with membrane 210 sequentially. Suitable methods for attaching or applying catalyst layer 206 to ion conduction membrane 210 depends on the type of catalyst layer 206. For dispersions of carbon particle supported catalysts, methods such as those taught in U.S. Pat. No. 5,211,984, incorporated herein by reference, using heat and pressure can be used. Nanostructured catalyst layers as taught in U.S. Pat. No. 5,338,430 can be embedded in the surface of membrane 210 using nip-roll calendering or rapid static pressing of a continuous roll supply of the nanostructured catalyst into a continuous roll supply of membrane 210. The catalyst can be applied in a patch-wise fashion from a continuous roll carrier holding the catalyst in the desired pattern.

Electrode backing layers 208 then can be applied in registry with catalyst electrode area 204 of ion conduction membrane 210 in a patch-wise fashion. Electrode backing layers 208 and catalyst layer 206 can also be applied in a continuous roll supply rather than in patch-wise fashion. Various attachment methods can be used for securing the electrode backing layers 208 prior to stack assembly. Suitable attachment methods for electrode backing layer 208 include pressure lamination, heated nip-roll lamination, limited area adhesive attachment (to avoid blocking all pores with adhesive), ultrasonic welding, microstructured surface mechanical attachment and the like. A secure bonding of electrode backing layer 208 with membrane 210 generally is desirable to minimize electrical and/or ionic resistivities across the interface between them, or to facilitate water management at the interface, especially the cathode interface. The parameters of the attachment process can be adjusted to provide the preferred degree of bonding. More secure bonding is especially desirable when catalyst layer 206 is applied first to electrode backing layer 208. Important requirements for the attachment methods are that the gas transport properties of electrode backing layers 208 are not adversely affected, that catalyst layers 206 are not poisoned and that ion conduction properties of the membrane 210 are not degraded.

Seals and gaskets 212, 216 can be fabricated or die-cut from any suitable laminar web material, such as Teflon™ sheeting or Teflon™ coated fiberglass sheeting available from The Furon Co., CHR Division (New Haven, Conn.) or other fluoroelastomers. The seal material can be applied to perimeter seal points 212 or gas port edges 216 of MEA roll 200. Attachment of the seals and gaskets to the membrane at those points can be done using attachment methods similar to those described above for attaching the electrode backing layers. In addition to the non-adhesive, laminar web seal materials, appropriate transfer adhesives also can be used. An example of such a transfer adhesive is #9485 PC adhesive available from 3M Co. (Saint Paul, Minn.).

The seals and gaskets materials and corresponding adhesives should not contain chemicals that can be extracted by the ion conduction membrane to lower its conductivity or poison the catalyst. Also, the seals and gaskets materials should be chemically and thermally inert to withstand the acidic environment (for proton exchange fuel cells) and operating temperatures of the fuel cell for thousands of hours. Furthermore, seals and gaskets 112, 116 should have adequate mechanical properties to have high resistance to creep and extrusion at the maximum operating temperatures of the stack under stack-applied compressive forces in the direction normal to the seal areas and under forces acting in the plane of the seals generated by internal pressure.

E. Stack Formation

A typical fuel cell stack may require more than a hundred cells to be assembled in series to obtain useful voltages. A hundred cells in series, each operating at a nominal 0.7 volts, would yield a 70 volt stack. Assembly of the MEAs and bi-polar/cooling plates with all the attendant gaskets and seals to produce a leak free, optimally compressed fuel cell stack can be a critical issue for reducing the cost of the stack. Providing the MEAs, seals and gaskets in a manufacture-ready format to facilitate cost effective assembly of a stack is an important issue. For example, to assemble only 10,000 fuel cell stacks per shift per production line per year requires one stack with hundreds of associated cell components to be assembled approximately every 10 minutes. Producing and handling such a large number of components, each sized, cut, oriented and held in proper registry, in such a short time is a significant consideration.

Figure 4:
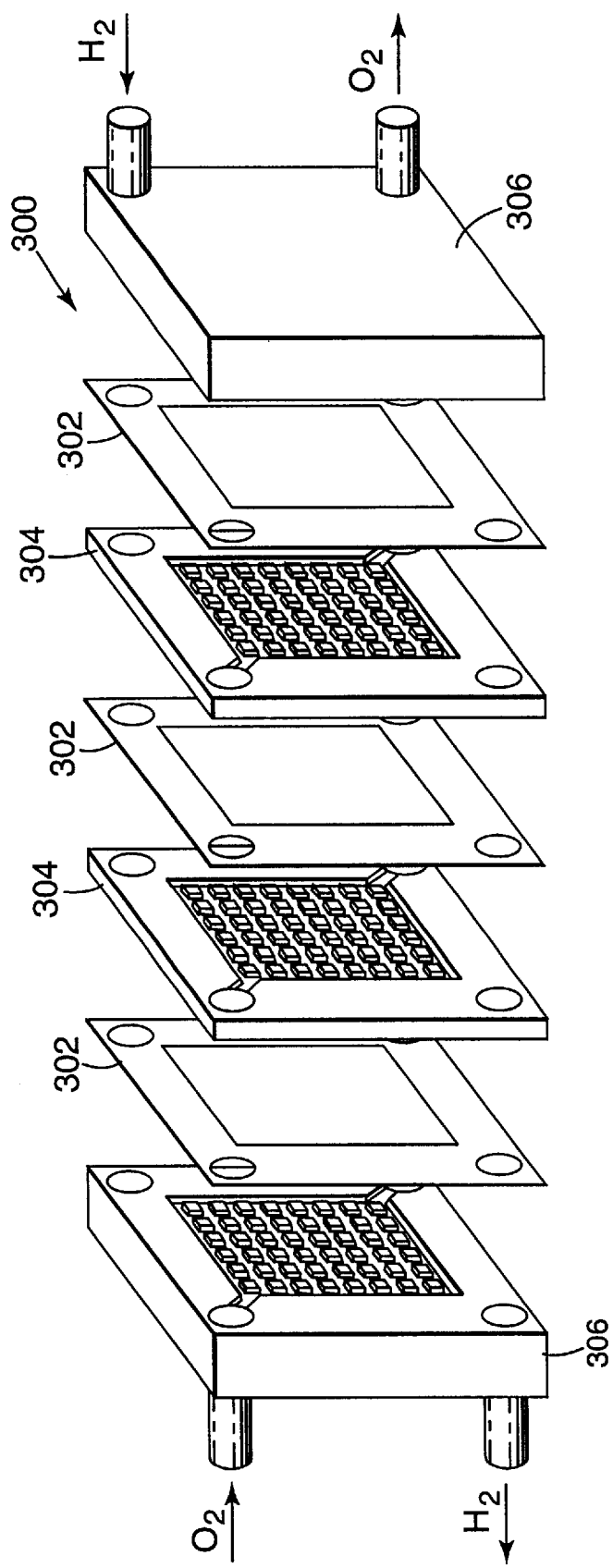
FIG. 4 is an exploded, perspective view of a fuel cell stack with three cells.

In a fuel cell stack 300, each individual cell consists of a 5-layer NEA 302 that is sandwiched between bi-polar plates 304, as shown in FIG. 4. End plates 306 provide for flow of fuel and oxidizing agent into and out from fuel cell stack 300. The bi-polar plates function to a) provide the series connection between cells by conducting the total electrical current produced by an MEA to the adjacent cell for eventual transmission at the end plates, b) prevent any gas transport between adjacent cells, c) provide mechanical rigidity to the assembled stack such that compressive forces are effective to minimize leakage of gases past the perimeter of the MEAs, d) provide flow field grooves and gas manifold ports for introducing the fuel and oxidant to the MEA catalyst electrodes and for removal of by-products such as water and e) provide contact with cooling fluids to extract waste heat from the cell electrode areas.

Although there can be many possible configurations and shapes for fuel cell stacks, generally they are rectilinear or cylindrical in shape so that the individual planar MEAs and bi-polar plates within each cell have a corresponding rectangular or circular shape. U.S. Pat. No. 5,252,410, incorporated herein by reference, teaches many aspects of bi-polar plates and stack assemblies including specific aspects for the case in which the catalyst is applied to the electrode backing layer. The active, catalyzed area of each NMA generally is smaller than the membrane area and can be centered on the MEA. The perimeter area of the membrane bordering the electrode area generally is used for sealing the MEA to the bi-polar plates, to prevent leakage of fuel and oxidant from the pressurized interior of the cell. Compressive forces applied from the end plates of the stack should be sufficient to keep the gaskets or seals from delaminating at the maximum internal pressures. The region of the MEA adjacent to the electrode area may also contain holes for transmission of fuel and oxidant to the cells from the respective gas supply manifolds. These holes (i.e., gas ports) also may require seals or gaskets to prevent leakage.

Above, a process is described for fabricating MEA's and supplying the MEAs with appropriate seals and gaskets in a continuous web format. The continuous web format is extremely well suited for producing and handling the large number of MEA elements used to construct the fuel cells at a cost effective rate. The continuous web is not only well suited for relatively rapid application to a bi-polar plate but also for accurate alignment of the MEA. Therefore, the electrode backing layers as described herein when adapted to the production of a 5-layer MEA in a continuous roll format yield dramatic advances in fuel cell processing.

EXAMPLES

Several properties are measured for the various electrode backing layers produced in the following examples. Bubble point is the largest pore size in the film as determined according to ASTM F-316-80. Ethanol was used as the test liquid. The liquid is used to fill the pores of the film. Pressure is applied until flow as bubbles takes place through the largest passageway through the film. The bubbles are observed from a tube that is connected to the low pressure side of the test cell and that is submerged in water. The necessary pressure depends on the surface tension of the test liquid and the size of the largest passageway. Bubble point in microns, using ethanol as the test liquid, is equal to 9.25/pressure in psi at breakthrough.

Gurley value is a measure of resistance of air flow through a film. Specifically, it is a measurement of the time in seconds for 100 cc (or other selected volume) of air to pass through one square inch of a film at a pressure of 124 mm of water, according to ASTM D-726-58, Method A. The film sample is clamped between two plates. Then, a cylinder is released that provides air to the sample at the specified pressure. The time for a given amount of air flow is determined from the marks on the cylinder, which are read electronically. In the Examples, Gurley values are reported for passage of 50 cc or 10 cc of air.

The in-plane electrical resistance is measured using two, 1.5 cm wide aluminum bars that are placed parallel to each other on the surface of the film. Weights were placed on top of the bars to give a pressure of 300 g/cm². The results generally are pressure dependent. The resistance between the two aluminum bars was measured using a standard ohm meter. Alternatively, z-axis electric resistance was measured at high current densities, as described in Example 6, below. The resistivity in ohm-cm was calculated using the following equation:

resistivity=(z-axis resistivity×area of film/thickness of film)

or resistivity=(in-plane resistance×width of the film×film thickness)/distance between bars The aqueous contact angle measurements described below were performed essentially as described in WO 96/344697. Briefly, using a commercial apparatus (Rame'-Hart contact Angle Goniometer, Model 100), an approximately 1 microliter droplet was expressed out a hypodermic syringe. Carefully raising the sample surface to just contact the droplet while still suspended from the syringe defined the "equilibrium contact angle". The droplet was then enlarged or shrunk while measuring the contact angle to obtain the advancing and receding contact angles, respectively. Multiple measurements were made and the mean and rms deviation obtained for both types of contact angles at multiple points on the surface. Membranes exhibiting a higher receding contact angle repel water to a greater extent that those exhibiting a lower receding contact angle. Without wishing to be bound by theory, it is believed that membranes that repel water to a greater extent are less likely to be flooded during the operation of a fuel cell, and will allow better flow of fuel and oxidant to the membrane/catalyst interface.

In the Examples:

"room temperature" or "ambient temperature" is taken as approximately 22° C.;

Vertrel 423™ is dichlorotrifluoroethane ($CHCl_2CF_3$), from DuPont Chemicals, Inc., Wilmington, Del.; and All other chemicals and reagents were obtained from Aldrich Chemical Co., Milwaukee, Wis., unless otherwise specified.

There are a number of basic processes and materials in common within the examples. These include the preparation of the nanostructured catalyst support, application of the catalyst to the support, determination of the catalyst loading, fabrication of the membrane-electrode assembly, the type of fuel cell apparatus and testing station, the fuel cell test parameters, and the kinds of proton exchange membranes used. These are defined in general as follows:

a) Nanostructured catalyst support preparation and catalyst deposition. In the following examples, the nanostructured catalyst electrodes and the process for making them are as described U.S. Pat. No. 5,338,430 and other patents referenced therein. The nanostructured catalyst consists of catalyst materials, e.g. Pt coated onto the outer surface of nanometer sized whisker-like supports. The whiskers are produced by vacuum annealing thin films (1000–1500 Angstroms) of an organic pigment material (C.I. Pigment Red 149, or PR149) previously vacuum coated onto substrates such as polyimide. The whisker-like supports, with lengths of 1–2 micrometers, grow with uniform cross-sectional dimensions of 30–60 nanometers, end-oriented on a substrate to form a dense film of closely spaced supports (30–40 per square micrometer) which can be transferred to the surface of a polymer electrolyte to form the catalyst electrode. The nanostructured catalyst electrode has a very high surface area which is readily accessible to fuel and oxidant gases.

b) Measurement of the catalyst loading is done both by monitoring the thickness of the Pt layer deposited during vacuum coating using a quartz crystal oscillator, as is well known in the art of vacuum coating, and by a simple gravimetric method. In the later case, a sample of the polyimide supported nanostructured film layer is massed using a digital balance accurate to 1 microgram, and its area measured. Then the nanostructured layer is wiped off the polyimide substrate using a paper tissue or linen cloth, and the substrate is remassed. Because a preferred property of the catalyst support is that it transfer easily and completely to the ion exchange membrane, it also can be easily removed by simple wiping with a cloth. The mass per unit area of the catalyst support particles, without Pt, can also be measured this way.

c) The ion exchange membranes used were all of the perfluorinated sulfonic acid type. Naflon™ 117 or 115 membranes were obtained from DuPont Corp., Wilmington, Del.

d) The process used for transferring the catalyst coated support particles into the surface of the PEM or DCC was a static pressing or a continuous nip-rolling method. To prepare an MEA with e.g. the catalyst on the PEM, with 5 cm$^2$ of active area by the static pressing method, two 5 cm$^2$ square pieces of the nanostructured catalyst, coated on a metallized polyimide substrate, one for the anode, one for the cathode, are placed on either side of the center of a 7.6 cm×7.6 cm proton exchange membrane. At least one 25 or 50 micrometer thick sheet of polyimide, of the same size as the PEM, is placed on each side of the PEM and nanostructured substrate stock to form a stack. For static pressing, one sheet of 50 micrometers thick Teflon™, of the same size as the PEM, is placed on each side of the PEM, nanostructured substrate and polyimide stack.

For static pressing, this assembly is then placed between two steel shim plates, and pressed at a temperature near 130° C. and pressures approaching 10 tons/cm$^2$ for up to two minutes, using a nine inch Carver™ press. A low grade vacuum may be applied to partially remove air (2 Torr) from the stack just prior to applying the maximum pressure. Before releasing stack pressure, the stack can be cooled usually for 5 minutes or less to near room temperature. The original 5 cm$^2$ polyimide substrates are then peeled away from the PEM leaving the catalyst attached to the surface of the PEM. (Alternatively the catalyst support particles can be transferred to the PEM or electrode backing by continuous roll processes such as passing the above sandwich assemblies in continuous or semi-continuous sheet form through the nip of a mil as in calendering or laminating processes. The two mill rolls can be heated, both made of steel, or steel and a softer material such as rubber, have a controlled gap or use controlled line pressure (kg/cm) to determine the gap of the nip.

e) The MEA's from step d) were mounted in a fuel cell test cell purchased from Fuel Cell Technologies, Inc., Albuquerque, N. Mex., generally a 5 cm$^2$, but up to 50 cm$^2$, sized cell. Two pieces of 0.015" thick ELAT electrode backing material, obtained from E-tek, Inc., Natick, Mass. was used as control electrode backing material. Teflon coated fiberglass gaskets, purchased from CHR Industries, nominally 250 micrometers thick, with 10 cm$^2$ square holes cut in the center (for the 10 cm$^2$ catalyst area), were used to seal the cell. The ELAT electrode backing material is designated as carbon only, i.e. it contains no catalyst.

f) The test parameters for the fuel cell polarization curves of examples 9–14 and 28, were obtained under the conditions of 207 kPa H$_2$ and 414 kPa oxygen gauge pressures with a cell temperature of 80° C., flow rates of approximately one standard liter per minute. The humidification of the gas streams was provided by passing the gas through sparge bottles maintained at 115° C. and 80° C. respectively for the hydrogen and oxygen.

For examples 15–17, polarization curves were obtained to test the low pressure air performance of the electrode backing materials. The curves in FIG. 12 were obtained under the conditions of 207 kPa H$_2$ and 34.5 kPa air gauge pressures. The H$_2$/air flow rates were 400/400 sccm (standard cubic centimeters per minute) for 10 cm$^2$ MEAs, and 1 standard liters per minute (slm)/2 sln for the 50 cm$^2$ MEAs. The humidification of the gas streams was provided by passing the gas through sparge bottles maintained at about 115° C. and 65° C., respectively, for the hydrogen and air. The cell temperature was 75° C. A membrane produced following the procedures described in Example 12 was also run under these fuel cell conditions. The results are plotted in FIG. 12 as Ex. 12 (air).

Example 1

Conductive Carbon in High Density Polyethylene

A dispersion of conductive carbon in mineral oil was prepared by wetting out 1032 g of Conductex™ 975 conductive carbon (Colombian Chemicals Co., Atlanta, Ga.) into a mixture of 2054 g of mineral oil (Superla® White Mineral Oil No. 31, AMOCO, Chicago, Ill.) and 1032 g of dispersant, OLOA 1200™ (Chevron Oil Co., San Francisco, Calif.) using a model 2500 HV dispersator (Premier Mill Corp., Reading, Pa.). Portions of the carbon and OLOA 1200 were added alternately to the mineral oil. As the carbon was added, the viscosity increased and the dispersator rpm increased accordingly to a maximum of about 5000 rpm after all the carbon and OLOA 1200 had been added.

The resultant dispersion was viscous and lumpy. It was then heated to about 150° C. while continuing to mix with the dispersator to degas it. The viscosity decreased as the temperature increased; the dispersator rate was reduced to 1100 rpm as the temperature increased. The mixture was held at about 150° C. for 20 min. The dispersion became smoother with continued mixing and heating. It was then allowed to cool to about 60° C. while continuing to mix. The resulting mixture was passed through a 1.5 L horizontal mill (Premier Mill Corp.) containing an 80 vol. % charge of 1.3 mm diameter chrome-steel beads. The horizontal mill was operated at a peripheral speed of 1800 fpm (54.9 meters/ minute) and at a through put rate of about 0.5 L/min.

The dispersion discharged from the horizontal mill was pumped at about 60° C. into an injection port on the third zone of a Berstorff™ co-rotating twin screw extruder (25 mm×825 mm, Berstorff Corp., Charlotte, N.C.). HDPE (high density polyethylene, grade 1285, Fina Oil & Chemical Co., Houston, Tex.) was metered into the feed zone (zone 1) at a rate of 0.55 kg(1.20 lb.)/hr. and the above dispersion was pumped in at a nominal rate of 69.1 cc/min. using a gear pump. The extruder profile starting from the feed zone was 193, 254, 254, 204, 166, 160, 166° C., the die temperature was 166° C., and the screw speed was 120 rpm.

Film was extruded through an 20.32 cm (8 in.) die onto a patterned casting wheel heated to 52° C. The wheel pattern had 45°, four-sided pyramids that were 0.125 mm (5 mil) high at a density of 100 per 6.45 sq. cm ( 1 square inch). The resultant film was 0.25 mm (10 mil) thick and the experimentally determined total film throughput rate was 4.53 kg (10.0 lb)/hr. Thus, the actual dispersion feed rate was 3.99 kg (8.8 lb)/hr. From this and the known dispersion composition, the total carbon content in the film after extraction of the oil was calculated to be 64.7 wt. %.

Example 2

Extraction Using Vertrel 423™

Oil and OLOA 1200 were extracted from the film of Example 1 in three washes by soaking a portion of the film measuring about 18 cm by 30 cm in about 1 L Vertrel 423™ solvent per wash for 10 minutes per wash. On drying at room temperature, film thickness was 0.0241 cm. Physical properties of the film are shown in Table 1.

Example 3

Extraction Using Toluene/Xylenes

Oil and OLOA 1200 were extracted from a portion of the film of Example 1 as described in Example 2, using a 1:1 v/v mixture of toluene/xylenes. Physical properties of the dried film, measuring 0.023 cm thick, are shown in Table 1.

Example 4

Post-extraction Heating, Vertrel 423™ Extraction

A portion of the film prepared as described in Example 2 was hung in a circulating air oven for ten minutes at 130° C. On cooling, the film measured 0.23 mm thick. Physical properties of the film, labeled "Example 4A", are shown in Table 1. Advancing and receding contact angles (water) for the film were 1580 and 1070, respectively.

Likewise, a portion of the film from Example 2 was heated in a circulating air oven for 10 minutes at 150° C. Physical properties of the film, labeled "Example 4B", are shown in Table 1.

Example 5

Post-extraction Heating, Toluene/Xylenes Extraction

Films prepared as described in Example 3 was hung in a circulating air oven for ten minutes at 130° C. On cooling, the film measured 0.23 mm thick. Physical properties of the film, labeled "Example 5A", are shown in Table 1.

Likewise, a portion of the film from Example 3 was heated in a circulating air oven for 10 minutes at 150° C. Physical properties of the film, labeled "Example 5B", are shown in Table 1.

TABLE 1

| Example | Extraction Solvent | Heated, ° C. | Bubble Point, $\mu$m | Gurley no., sec/50 cc | X-Y resistivity* ohm-cm |
|---|---|---|---|---|---|
| 2 | V[1] | No | 0.10 | 310 | 6.7 |
| 3 | T/X[2] | No | — | — | 0.97 |
| 4A | V | 130 | 0.15 | 180 | 0.75 |
| 4B | V | 150 | — | — | 0.67 |
| 5A | T/X | 130 | 0.14 | 105 | 0.53 |
| 5B | T/X | 150 | — | — | 0.53 |

[1]Vertrel 423 ™
[2]Toluene/Xylenes (1:1 v/v)
*low current measurement between parallel aluminum bars with 0.5 kg/cm$^2$ applied pressure As shown in Table 1, heating the film above the melting point of the HDPE binder (126° C., peak temperature by DSC) resulted in a significant decrease in Gurley, a significant increase in bubble point, and a significant decrease in resistivity.

Example 6

Film Impedance

Figure 6:
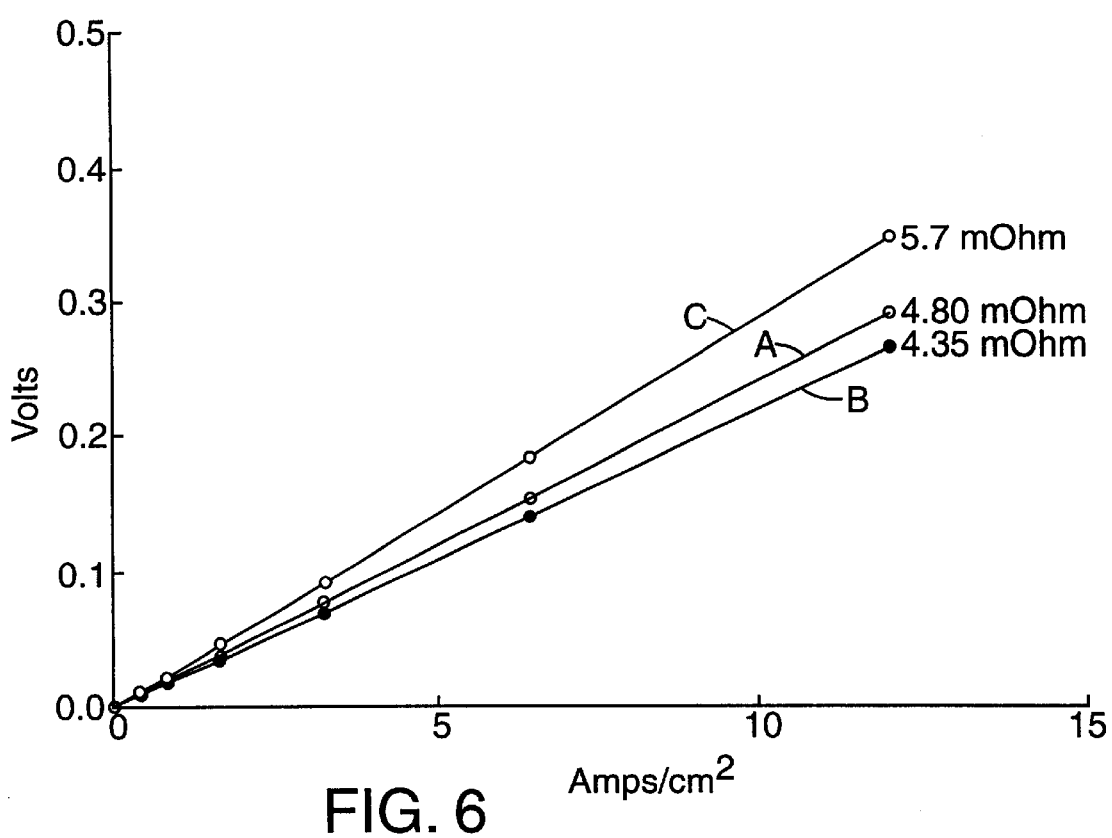
FIG. 6 is a graph of cell voltage vs current density to obtain the resistivity at high current density of carbon-loaded electrode backing materials obtained using the TIPT process.

The ability of carbon-loaded films of the invention to carry large current densities, suitable for fuel cells, was demonstrated. Two 5 cm$^2$ square samples of the film from Example 4A (Vertrel 423™ extraction, 130° C. heating) were mounted face-to-face in direct parallel contact with one another in a fuel cell test fixture (2.24 cm×2.24 cm, Fuel Cell Technologies, Inc., Santa Fe, N. Mex., i.e., there was no intervening ion conductive membrane between the samples. Masking frames of Teflon™ impregnated fiberglass 0.015 cm thick were used between the test cell halves as commonly used in actual fuel cell tests, to prevent crushing the films to be examined. Cell bolts were torqued to 12.4 N-m (110 in-lbs). High current levels were passed through the cell at various voltages to measure the impedance of the films under high current density conditions. Results of these measurements are shown in FIG. 6, trace A. After measurements were taken, the combined thickness of the films was 0.042 cm. Resistivity of the films was measured as 0.57 ohm-cm, comparable to the value shown in Table 1.

Example 7

Film Impedance

Films prepared in Example 5A (toluene/xylenes extraction, 130° C. heating) were examined as described in Example 6 to measure their impedance. Results are shown in FIG. 6, trace B. Measured resistivity of these films, having a combined thickness of 0.042 cm, was 0.52 ohm-cm.

Example 8 (Comparative)

Film Impedance

The resistivity of a carbon-only material (woven graphite cloth impregnated/coated with carbon black/PTFE) commercially available as ELAT™ (Etek, Inc., Natick, Mass.) was examined as described in Example 6. Results are shown in FIG. 6, trace C. Combined thickness of the ELAT™ films was 0.094 cm, giving an effective bulk resistivity of 0.28 ohm-cm. The Gurley value of the ELAT™ material was measured to be 7.5 sec/50 cc, and the advancing and receding contact angles of the film were 155° and 133°, respectively.

Example 9

Membrane Electrode Assembly

Figure 7:
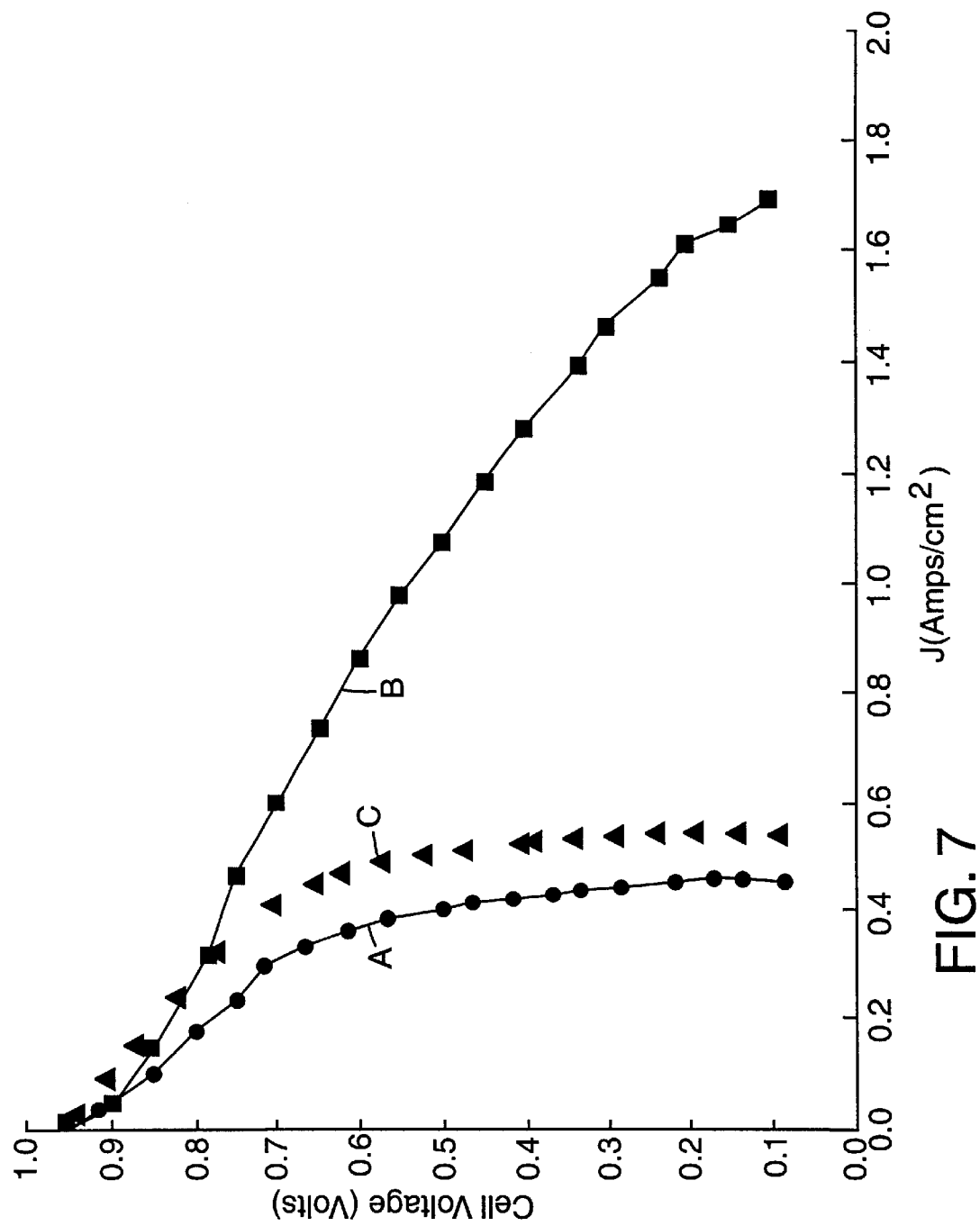
FIG. 7 is a graph of cell voltage versus current density for two five layer MEAs incorporating electrode backing layers produced using the TIPT process and, for comparison, a cell produced using commercial electrode backing material.

A proton exchange membrane electrode assembly (MEA) was prepared by applying an electrode layer comprising platinum-coated nanostructured supports, as described in U.S. Pat. No. 5,338,430, the teachings of which are incorporated herein by reference, to the central portion of a 7.6 cm×7.6 cm square Nafion™ 117 ion exchange membrane (DuPont Chemicals Co., Wilmington, Del.). The platinum-coated nanostructured supports were applied to both sides of the ion exchange membrane using a hot platen press as described in Example 5 of the above-incorporated '430 patent. The centered electrode area was 5 cm. Two 5 cm2 pieces of the carbon-filled electrode backing layer formed as described above in Example 5A (toluene/xylenes extraction, 130° C. heating) were placed on either side of the electrode assembly, to form a 5-layer MEA. The assembly was mounted in a 5 cm$^2$ test cell and tested on a fuel cell test station (Fuel Cell Technologies, Inc.), using hydrogen/oxygen gas flows applied to respective sides of the assembly. FIG. 7, trace A, shows a polarization curve of voltage vs. current density produced with this assembly.

Example 10

Membrane Electrode Assembly

A membrane electrode assembly was prepared as described in Example 9 except that an electrode backing layer as described in Example 3 (toluene/xylene extraction, no heating) was used. In addition, the entire assembly comprised 50 cm$^2$ electrodes and electrode backing membranes, rather than 5 cm$^2$. FIG. 7, trace C, shows a polarization curve of voltage vs. current density produced by this assembly. The improved performance of this cell can be attributed, in part, to the larger electrode size.

Example 11 (Comparative)

Membrane Electrode Assembly

A membrane electrode assembly was prepared as described in Example 9 except that the ELAT™ material described in Example 8 was used as the electrode backing layer. FIG. 7, trace B, shows a polarization curve of voltage vs. current density produced by this assembly.

Examples 9–11 show that an effective electrode backing layer of the invention can be prepared by the TIPT method. A premium grade commerically-available membrane provided better fuel cell performance, perhaps due, in part, to a lower Gurley value and a higher receding contact angle. A lower Gurley value and a higher receding contact angle may be indicative of higher diffusion of hydrogen and oxygen to the catalyst/electrolyte interface and lesser susceptibility to flooding with water produced at the cathode, which would further limit oxygen transport.

Example 12

Graphite/Conductive Carbon (95/5) in Ultrahigh Molecular Weight Polyethylene (TIPT)

A dry blend of 37.11 g MCMB 6-28 graphite (nominally 6μ mean diameter, Osaka Gas Chemical Co., Osaka, Japan) and 1.91 g Super P conductive carbon (MMM Carbon Div:, MMM nv, Brussels, Belgium) was prepared using a spatula for mixing. Portions of this mixture and portions of 32.2 g mineral oil (Superla® White Mineral Oil No. 31) were added alternately to the mixing chamber of a Haake Rheocord™ System 9000 (Haake (USA), Paramus, N.J.) equipped with roller blades. The mixing chamber was at 60° C., while mixing at 50 rpm. Then, heating to a set point of 150° C. was begun.

When the mix temperature reached 120° C., 2.06 g of ultrahigh molecular weight polyethylene (UHMWPE, grade GUR 4132, Hoechst Celanese Corp., Houston, Tex.) was added in portions with time allowed between additions for the previous material to be assimilated. The ratio of UHMWPE/oil was 6/94. After this addition was completed, the temperature of the chamber was increased to 150° C., and the mixing rate was increased to 80 rpm. Mixing was continued for 10 min. after the addition of the UHMWPE had been completed. The mixture was removed from the mixer while still hot.

After cooling, 15 g of solidified mixture was placed between 0.175 mm (7 mil) polyester sheets and placed in a Model 2518 Carver™ press (Fred S. Carver Co., Wabash, Ind.) at 160° C. with 0.25 mm (10 mil) shims placed between the polyester sheets. After heating in the press for 3 min. with no applied pressure, the mixture was pressed for 10 sec. using 690 kPa (100 psi). The resultant film with polyester sheets still attached was immersed into water at ambient temperature to quench it. The oil was extracted from the film as described in Example 2. A portion of the film was heated at 130° C. for 10 min. in a circulating air oven, as described in Example 4. Physical properties of the film are shown in Table 2. Advancing and receding contact angles (water) for the film were 154°±10 and 101°±5, respectively.

TABLE 2

| Parameter | After Washing/ Drying, Before Heating | After Heating for 10 min. at 130° C. |
|---|---|---|
| Caliper, mm | 0.215 | 0.215 |
| Gurley (sec./50 cc) | 95 | 60 |
| Bubble Point (microns) | 0.23 | — |
| Resistivity (ohm-cm) | 7.3 | 4.6 |

Figure 8:
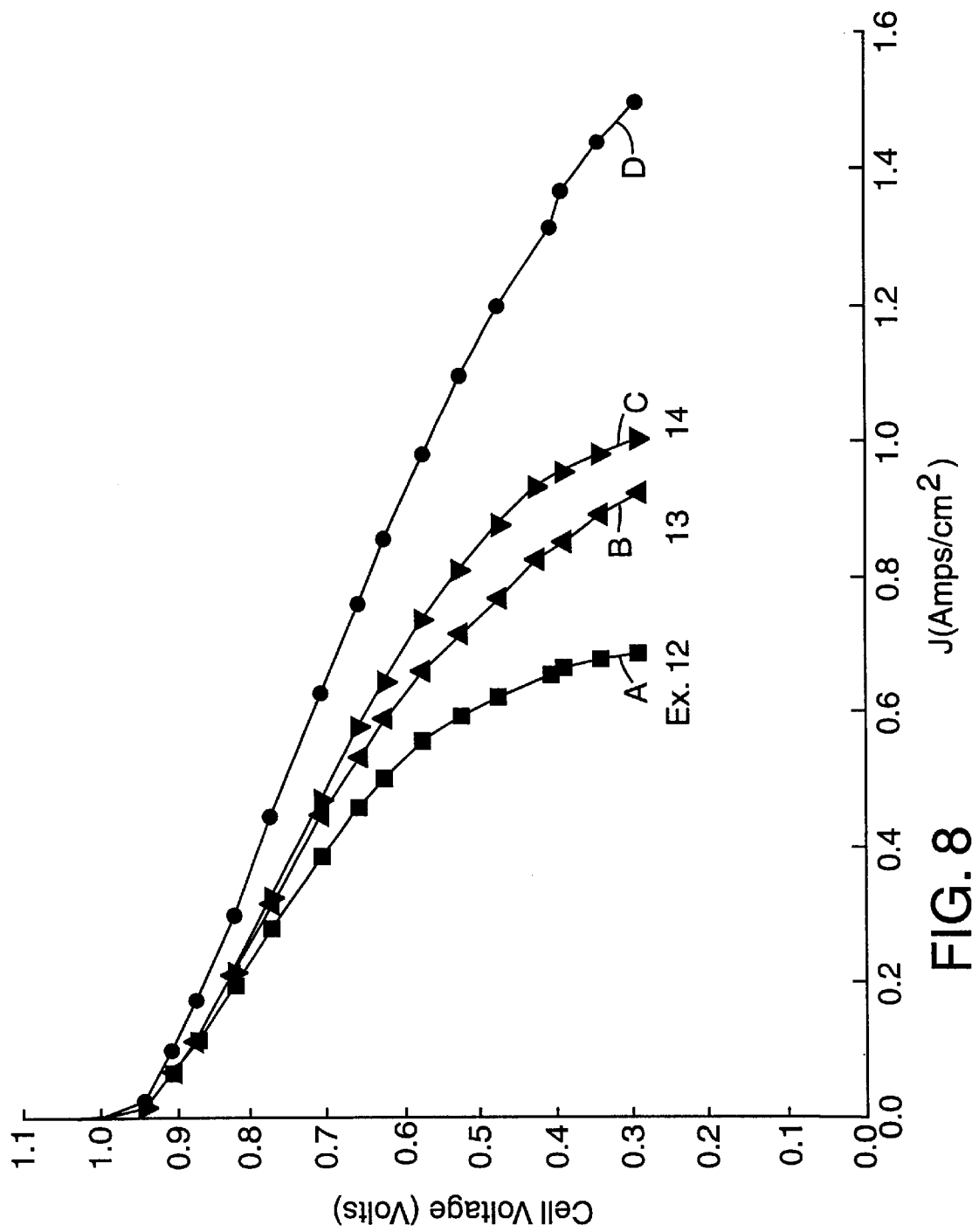
FIG. 8 is a graph of cell voltage vs current density for additional cells produced with carbon-loaded electrode backing materials obtained using the TIPT process and, for comparison, a cell produced using commercial electrode backing materials.

Curve A in FIG. 8 shows a representative polarization curve from a fuel cell test using a 50 cm$^2$ cathode backing layer made after heating, as described in this example. The same catalyst coated ion conduction membrane was used to obtain the fuel cell polarization curves for the 5-layer MEAs using different electrode backing layers of Examples 12–14 and the ELAT™ control (curve "D" in FIG. 8). After testing one sample electrode backing layer, the test cell was opened, and the electrode backing layer replaced on the cathode with the next one. The ELAT™ anode backing layer remained unchanged.

Example 13

Graphite/Conductive Carbon (95/5) in Polypropylene (TIPT)

A mixture of MCMB 6-28 graphite and mineral oil (Superla® White Mineral Oil No. 31) was prepared by mixing 83.3 g of graphite into 91.9 g of mineral oil using a dispersator. Super P conductive carbon, 1.53 g, was poured into the mixing chamber of a Haake Rheocord™ System 9000 mixer equipped with roller blades at 100° C. Then, while mixing at 50 rpm, 59.73 g of the graphite/mineral oil mixture was poured into the mixing chamber. As the viscosity increased during the addition of the graphite/mineral oil mixture, the mixing rate was increased to 100 rpm. Then, 7.66 g of polypropylene (grade DS5D45 from Shell Chemicals, Houston, Tex.) were added. The mixture was heated to 230° C. over a period of about 10 min. Total mixing time after addition of polypropylene was about 33 min. The resultant mixture was removed from the mixer while hot.

After cooling, 14.2 g of the solidified mixture was placed between 0.175 mm (7 mil) polyester sheets, which had been coated with a thin coating of mineral oil to facilitate release, and placed in a Carver press at 160° C. with 0.25 mm (10 mil) shims placed between the polyester sheets. After heating in the press for 3 min. with no applied pressure, the mixture was pressed for 10 sec. using 345 kPa (50 psi). The resultant film with polyester sheets still attached was immersed in water at ambient temperature to quench it. Oil was extracted from the film as described in Example 2. A portion of the film was heated in a circulating air oven for 10 min. at 180° C. Physical properties of the film before and after heating are shown in Table 3. It was noted that the film became somewhat brittle after this heating procedure. Advancing and receding contact angles (water) for the film were 155°±5 and 100°±5, respectively.

TABLE 3

| Parameter | After Washing/Drying, Before Heating | After Heating for 10 min. at 180° C. |
|---|---|---|
| Caliper (mm) | 0.205 | 0.200 |
| Gurley (sec./50 cc) | 32 | — |
| Bubble Point (microns) | 0.66 | — |
| Resistivity (ohm-cm) | 8.96 | 1.5 |

Trace B in FIG. 8 shows a representative polarization curve with the cathode electrode backing layer made from the heated film. It displays an improved performance relative to the sample from Example 12.

Example 14

Graphite/Conductive Carbon (95/5) in Ultrahigh Molecular Weight Polyethylene (TIPT)

A dry blend of 27.89 g MCMB 6-28 graphite, and 1.47 g Super P conductive carbon, was prepared using a spatula for mixing. Portions of this mixture and portions of 37.1 g mineral oil (Superla™ White Mineral Oil No. 31) were added alternately to the mixing chamber of a Haake Rheocord-™ System 9000 mixer equipped with roller blades at 40° C. while mixing at 50 rpm. Then, 1.55 g of UHMWPE (grade GUR 4132, Hoechst Celanese Corp.) were added. The ratio of UHMWPE/oil was 4/96. After addition of the polymer was completed, the temperature of the chamber was increased to 150° C, and the rpm were increased to 80. Mixing was continued for 10 min. after the addition of the UHMWPE had been completed. The mixture was removed from the mixer while still hot.

After cooling, 13.1 g of the solidified mixture was placed between 0.175 mm (7 mil) polyester sheets and placed in a Carver press at 160° C. with 10 mil shims placed between the polyester sheets. After heating in the press for 3 min. with no applied pressure, the mixture was pressed for 10 sec. using 345 kPa (50 psi). The resultant film with polyester sheets still attached was immersed into water at ambient temperature to quench it. The oil was extracted from the film as described in Example 2. A portion of the film was heated at 130° C. for 10 min. in a circulating air oven, as described in Example 4. The peak melting point of the UHMWPE was 138° C. as determined by DSC. Physical properties of the film are shown in Table 4. Advancing and receding contact angles (water) for the film were 139°±10 and 79°±9, respectively.

TABLE 4

| Parameter | After Washing/Drying, Before Heating | After Heating for 10 min. at 130° C. |
|---|---|---|
| Caliper (mm) | 0.150 | 0.150 |
| Gurley (sec./50 cc) | 36.8 | 19.6 |
| Bubble Point (microns) | 0.93 | 0.60 |
| Resistivity (ohm-cm) | 36 | 9.7 |

Trace C in FIG. 8 displays a representative polarization curve with a cathode electrode backing layer made from the heated film. Further improvement is observed relative to Example 13. Trace D involves the ELAT™ control.

Figure 12:
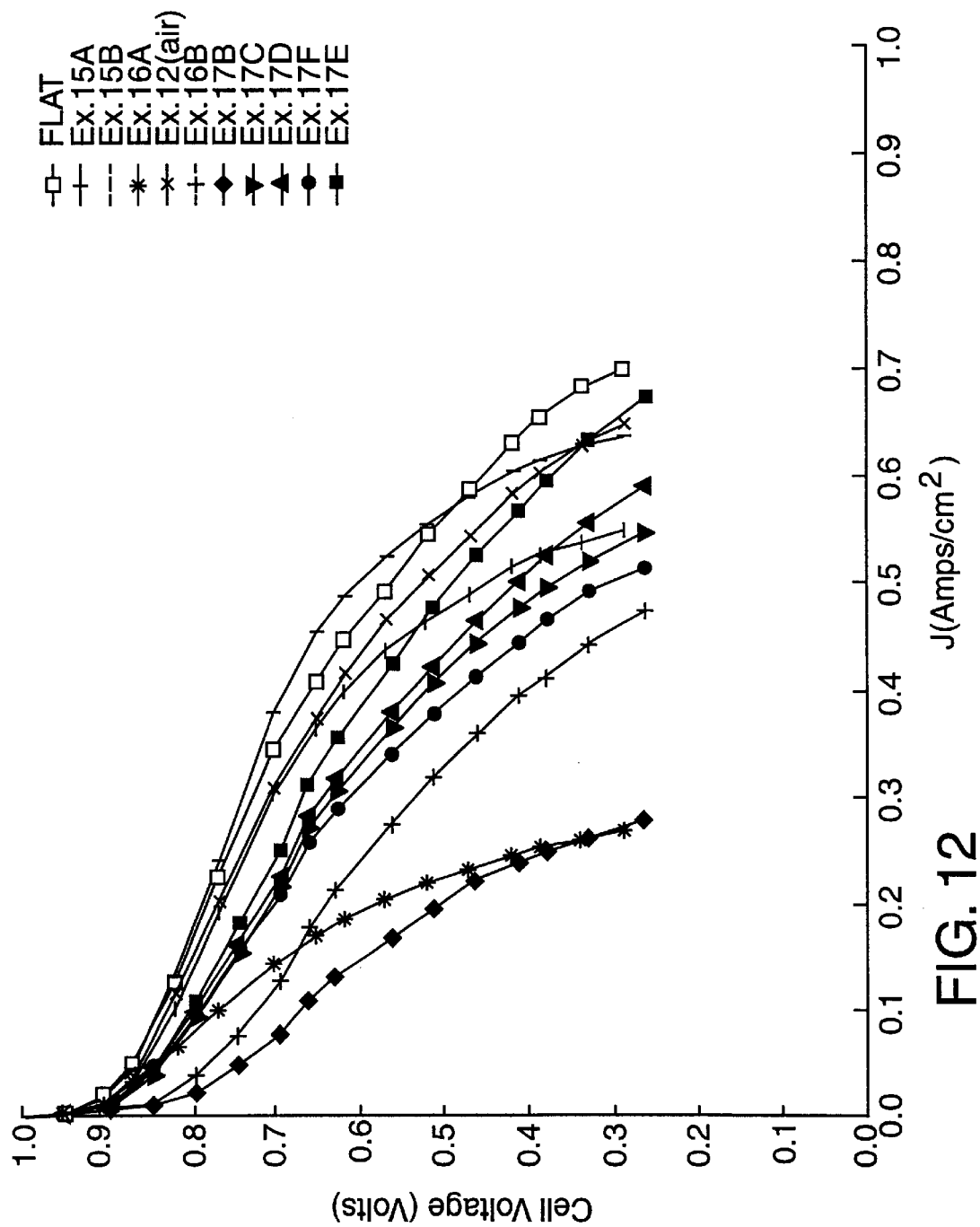
FIG. 12 is a graph of cell voltage versus current density for fuel cell MEA's incorporating electrode backing layers produced using the TIPT process along with a control incorporating a commercial material, each tested with equivalent catalyst coated ion conduction membranes.

In the following Examples 15A, 15B, 16A, 16B, 17B, 17C, 17D, 17E and 17F, equivalent catalyst coated ion conduction membranes were used for tests of different types of cathode backing layers. Commercial ELAT™ was used in each case as the anode backing layer. The fuel cell polarization curves for these examples are summarized in FIG. 12, and demonstrate the effects of the different parameters tested under low pressure air operation. The comparative control curve with ELAT™ as the cathode backing layer is also shown in FIG. 12. Referring to FIG. 12, in the useful voltage range of 0.6 volts and higher, the electrode backing layer of Example 15A exceeds the performance of the ELAT™ membrane.

Example 15

Graphite/Conductive Carbon in Polyvinylidene Fluoride

A mixture of 91.37 g of MCMB 6-28 graphite in 96.18 g of propylene carbonate was prepared by using a dispersator. Then, 1.60 g Super P conductive carbon was added to the mixing chamber of a Haake Rheocord™ System 9000 mixer at 50° C. and 50 rpm, followed by addition of 63.0 g of the above graphite-propylene carbonate mixture. While heating the resulting mixture to 150° C., 12.47 g Solef 1010™ polyvinylidene fluoride (PVDF, Solvay America Inc., Houston, Tex.) was added in portions at a rate such that the added polymer was assimilated into the mixture. When steady torque had been established (approximately 6 minutes after commencing polymer addition), the temperature set point was changed to 120° C. and cooling commenced. After approximately 4 minutes of cooling, stirring was stopped and the resulting mixture removed while hot.

After cooling, 12 g of solidified mixture was placed between two sheets of polyimide film with 0.25 mm (10 mil) shims between the polyimide film, and placed in a Carver press at 150° C. After heating for 90 sec. with no applied pressure, the press was closed for 5 seconds using 1035 kPa (150 psi). The resultant film with polyimide sheets still attached was placed between two 15 mm thick steel plates at 20° C. until the film was cool, after which the polyimide film was removed. The resultant PVDF film was washed and then dried as described in Example 2, except that 3×1 L isopropyl alcohol washes were used to extract the propylene carbonate to give sample 15A. A portion of the film was heated at 160° C. for 10 min. in a circulating air oven, as described in Example 4 to give sample 15B. Physical properties of the film are shown in Table 5. The fuel cell polarization results are shown in FIG. 12.

TABLE 5

| | After Washing/ Drying, Before Heating (15A) | After Heating for 10 min. at 160° C. (15B) |
|---|---|---|
| Caliper, mm | 0.241 | 0.230 |
| Gurley (sec./50 cc) | 57 | 39 |
| Resistivity (ohm-cm) | 1.20 | 0.96 |
| Advancing Contact Angle | 143 ± 10° | 141 ± 8° |
| Receding Contact Angle | 87 ± 12° | 87 ± 8° |

Example 16

Graphite/Super S Conductive Carbon (95/5) in High Density Polyethylene (TIPT)

This example demonstrates useful performance at a much lower loading of carbon. This film was made using the extruder described in Example 1 and was cast onto a smooth casting wheel (32° C. set point temperature). Film made this way has typically smaller pores on the wheel side than on the air side.

A dispersion of SFG 15 graphite (Alusuisse Lonza America Inc., now Timcal, Fair Lawn, N.J.) was prepared by adding incrementally 1090 g Qf SFG 15 to a mixture of 3030 g of mineral oil (Superla™ White Mineral Oil No. 31) and 57.4 g of dispersant, OLOA 1200 using a Model 89 dispersator from Premier Mill Corp. Then, 57.4 g of Super S conductive carbon MMM Carbon Div., MMM nv, Brussels, Belgium) was mixed into the graphite dispersion. The carbon/oil mixture was heated to 150° C. and held at 150° C. for 30 min. while continuing to mix with the dispersator (rpm were lowered as temperature increased). The mixture was cooled to 70° C. before being transferred to the feed tank of the extruder.

The carbon/oil mixture was pumped into an injection port on the third zone of a Berstorff™ co-rotating twin screw extruder (25 mm×825 mm). High density polyethylene (HDPE, grade 1285, Fina Oil & Chemical Co.) was metered into the feed zone (zone 1) at a rate of 0.61 kg (1.35 lb)/hr., and the above mixture was pumped in at a nominal rate of 77 cc/min. using a gear pump. The extruder profile starting from the feed zone was 199, 271, 271, 188, 188, 188, 188° C., the die temperature was 188° C., and the screw speed was 125 rpm.

Film was extruded through an 20.32 cm (8 in.) die onto a smooth casting wheel at 32° C. A 50 micrometer polyester film was inserted on top of the film after quenching while still on the casting wheel to aid in film handling by preventing slippage on the wheel. The resultant extruded film was 0.3 mm (12 mil) thick and the experimentally determined total film throughput rate was 5.39 kg (11.9 lb.)/hr. Thus, the actual carbon/oil mixture feed rate was 4.80 kg (10.6 lb.)/hr. From this and the known compositions, the total carbon content in the film after extraction of the oil was calculated to be 68.0 wt. %

Figure 14A:
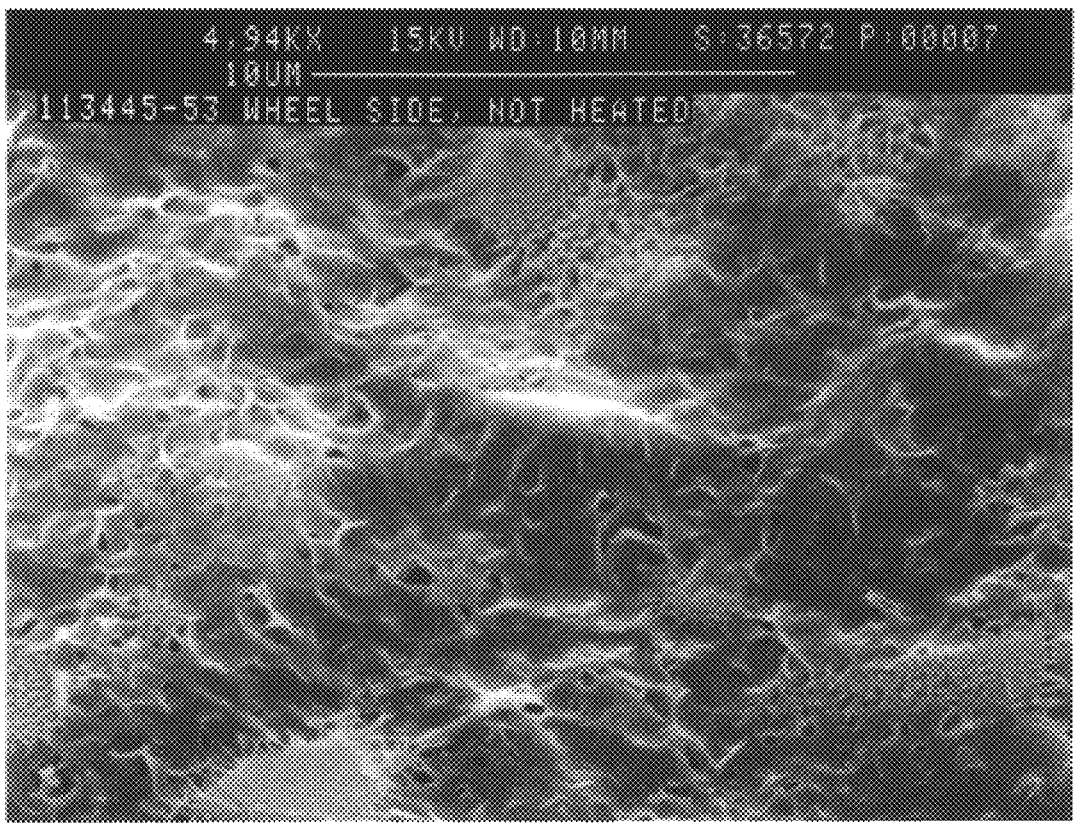
FIG. 14A is a SEM micrograph of the casting wheel side of the carbon-filled HDPE film of Example 16A without heat treatment.
Figure 14B:
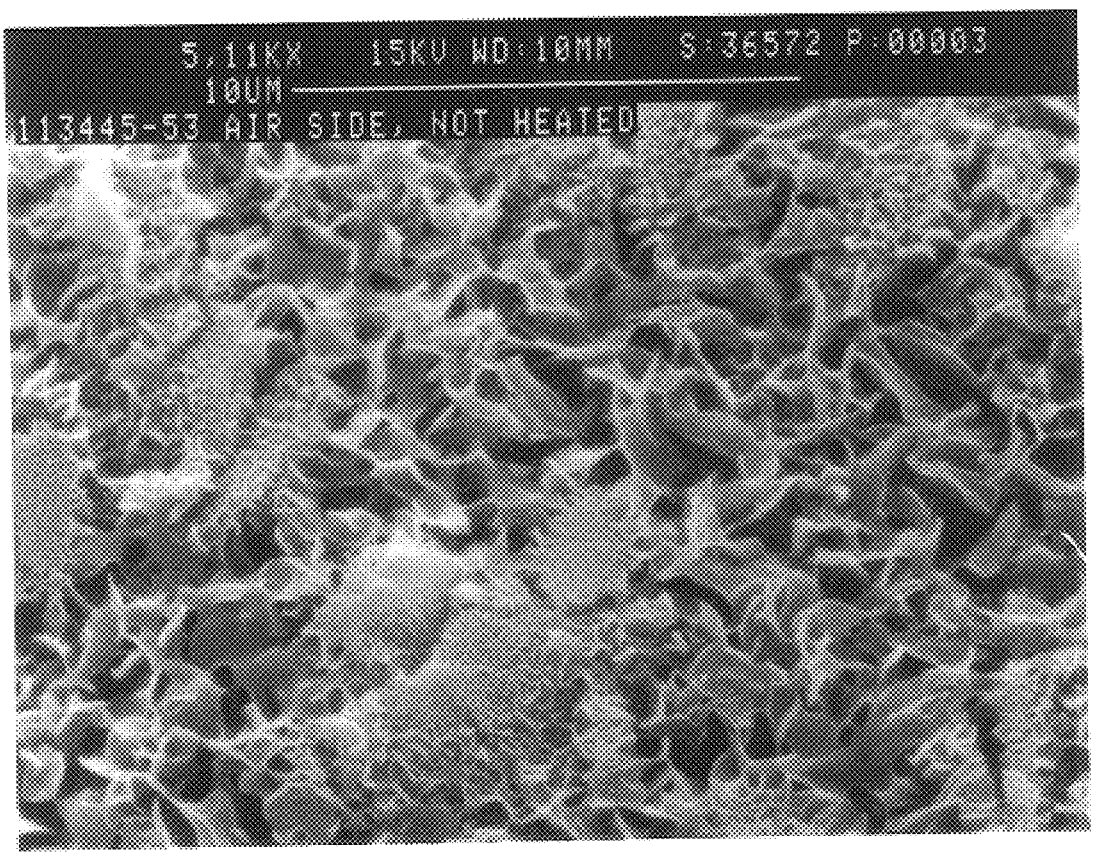
FIG. 14B is a SEM micrograph of the air side of the carbon-filled HDPE film of Example 16A without heat treatment.
Figure 14C:
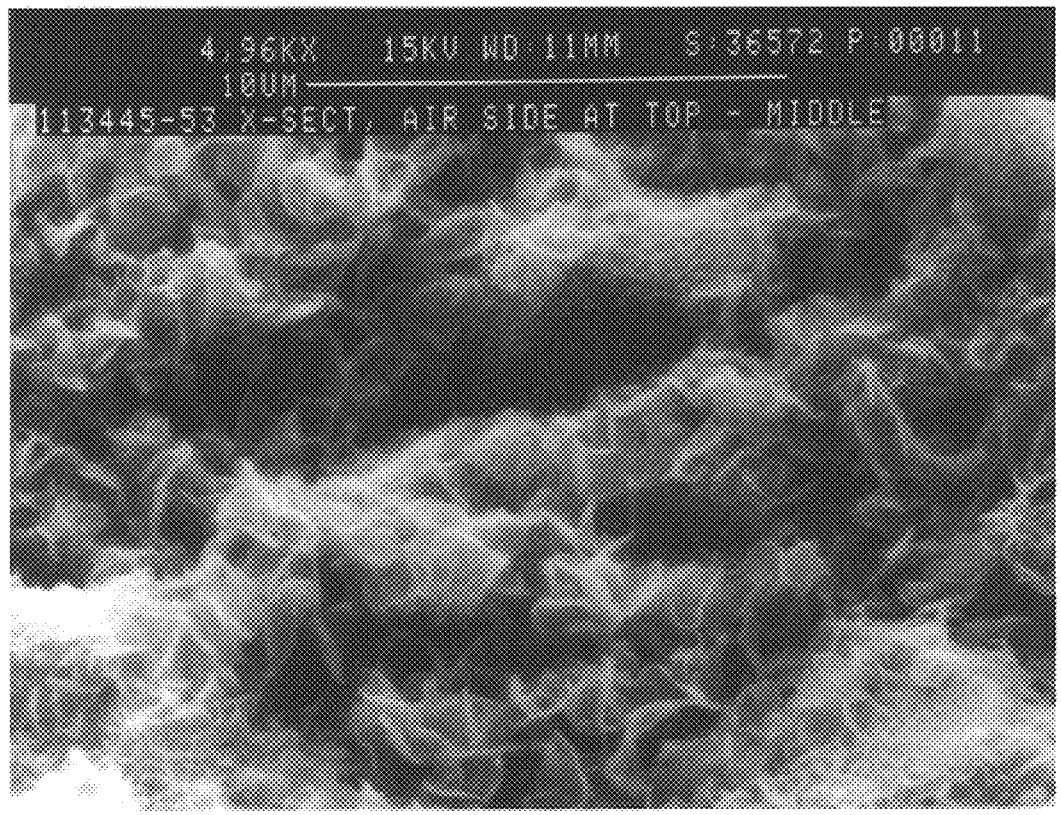
FIG. 14C is a SEM micrograph of a cross-section of the carbon-filled HDPE film of Example 16A without heat treatment.
Figure 15A:
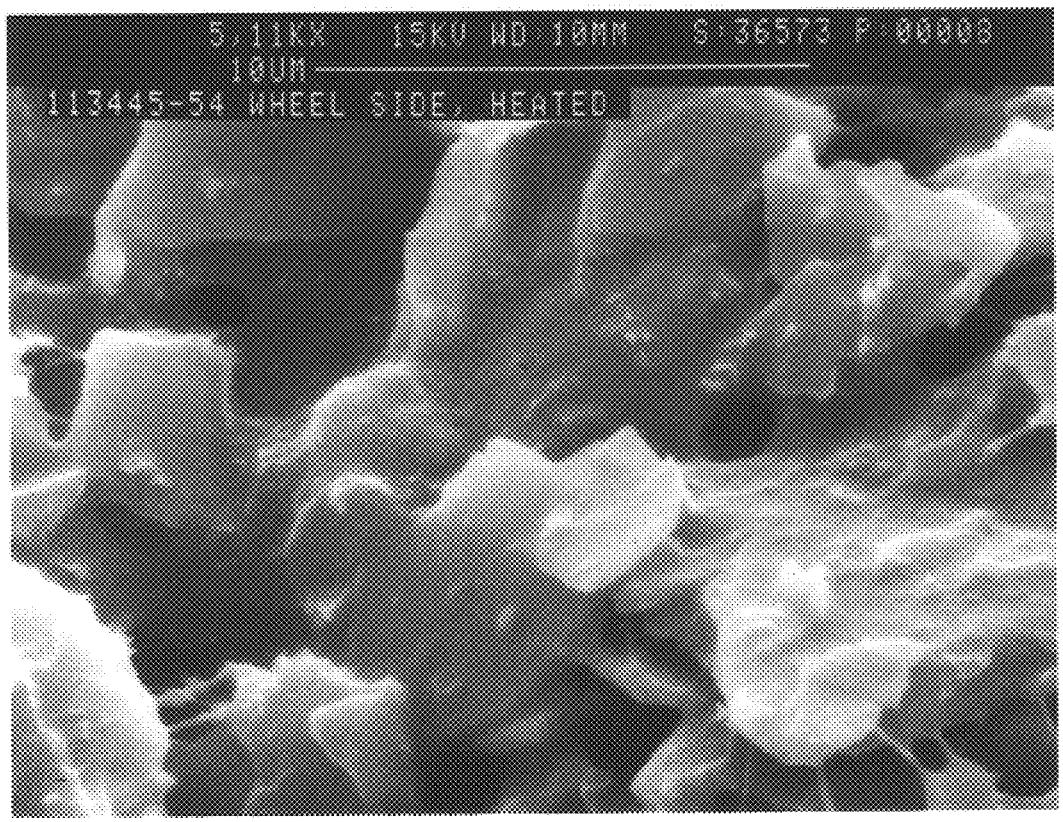
FIG. 15A is a SEM micrograph of the casting wheel side of the carbon-filled HDPE film of Example 16B following heat treatment at 130° C.
Figure 15B:
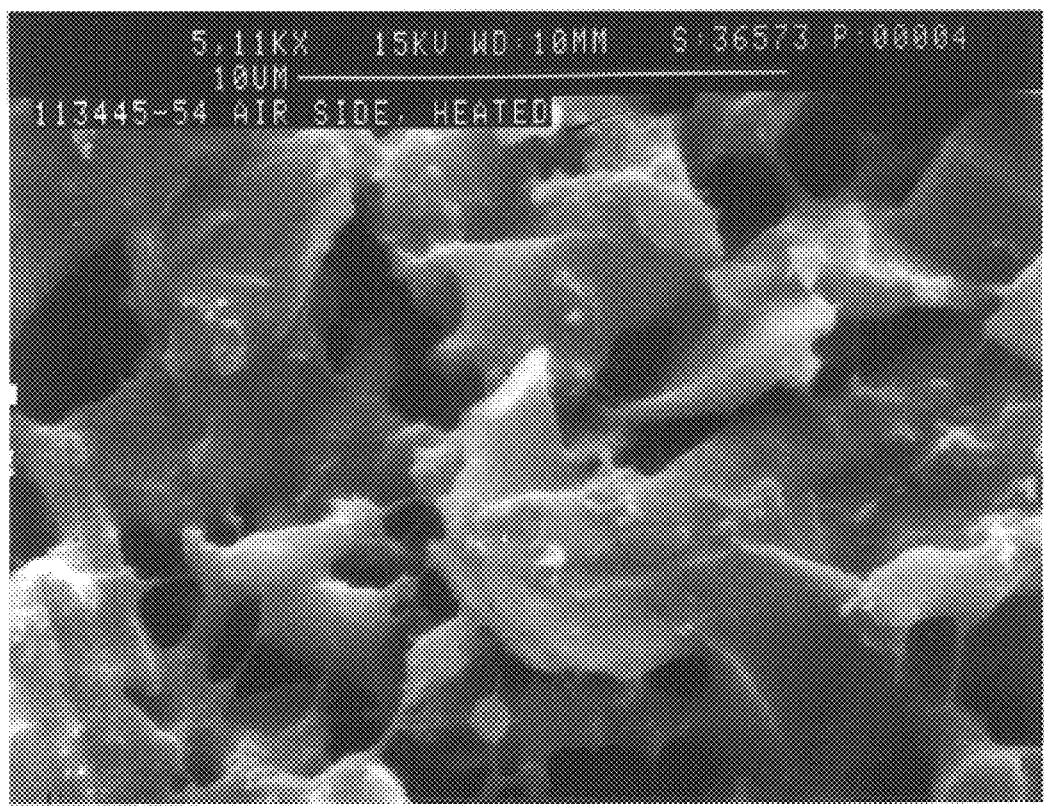
FIG. 15B is a SEM micrograph of the air side of the carbon-filled HDPE film of Example 16B following heat treatment at 130° C.
Figure 15C:
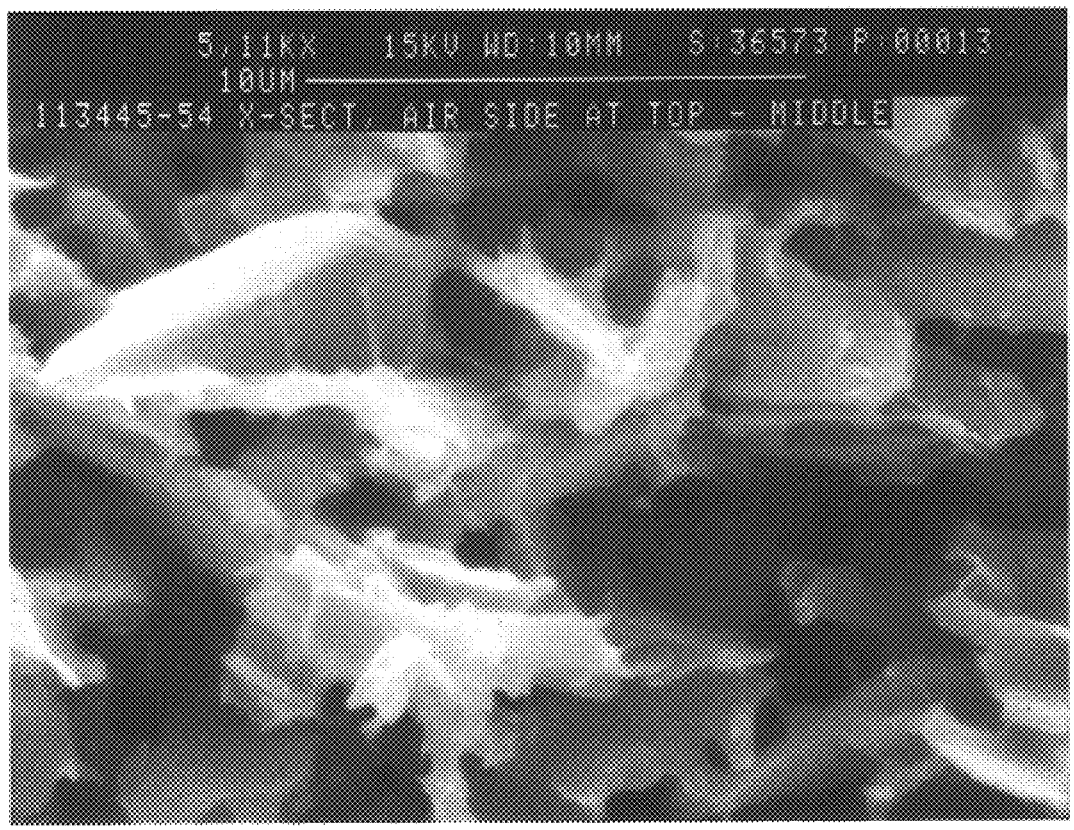
FIG. 15C is a SEM micrograph of the cross-section of the carbon-filled HDPE film of Example 16B following heat treatment at 130° C.

The oil and OLOA 1200 were extracted from the film using three ×15 min. washes using Vertrel 423. About 1 L of solvent per wash was used for a piece of film that was about 17.8 cm (7") wide by 30.5 cm (12") long. The film was then hung in an exhaust hood to dry to give sample 16A. A piece of this film was hung in a circulating air oven for 10 min. at 130° C. to give sample 16B. As shown in Table 6, below, heating the film above the melting point of the HDPE used, 126° C., resulted in a significant decrease in Gurley value, significant increase in bubble point, and significant decrease in resistivity. Physical properties of the film are shown in Table 6. Fuel cell polarization curves using these membranes are shown in FIG. 12. For both 16A and 16B, the casting wheel side of the film was toward the MEA. The photomicrographs of the casting wheel side, air side and cross sections of films 16A and 16B are shown in FIGS. 14 and 15, respectively. The SEM results show the differences in pore size between the casting wheel and air sides of the films, and the general enlargement of pore sizes throughout film 16B due to heating, as described.

TABLE 6

| | After Washing/ Drying, Before Heating (16A) | After Heating for 10 min. at 130° C. (16B) |
|---|---|---|
| Caliper, mm | 0.285 | 0.274 |
| Gurley (sec./50 cc) | 245 | 20.8 |
| Bubble Point (microns) | 0.38 | 1.16 |
| Resistivity (ohm-cm) | 71 | 1.45 |

Results given in Examples 17 and 18 below show that similar physical properties were obtained 1. by either heating the film above the melting point of the HDPE and then stretching at a normal stretch temperature for porous HDPE (usually about 180 to 220° F.), or
2. by stretching at a higher temperature that would normally result in loss of porosity of an unfilled HDPE in the membrane.

Example 17

Effect of Stretching and Heating on TIPT Membranes

Samples of the film prepared as described in Example 2 were variously heated and stretched as shown in Table 7. The film was stretched using a film stretcher from T. M. Long Co., Somerville, N.J. After inserting the film into the stretcher at the indicated temperature, the film was heated for about 30 sec. before stretching. Stretching was performed in one direction or sequentially in both directions at about 2.54 cm/sec. After stretching, the films were annealed at the stretching temperature for about 2 min. before releasing the stretcher grips and removing the stretched film. In the Table, the degree of stretching is indicated in terms of the ratio of final dimension divided by initial dimension: a stretch ratio of 1.25×1 means that the film was stretched uniaxially by 25% (12.7 cm final length, 10.2 cm initial length). 1.25×1.25 means that the film was stretched by 25% in both directions, sequentially. Simultaneous biaxial stretching in both directions is also possible.

TABLE 7

| Ex. | Treatment | Stretch Ratio | Stretch Temp., °C. | Caliper, mm | Bubble Point, μm | Gurley, sec./50 cc | Resistivity, ohm – cm |
|---|---|---|---|---|---|---|---|
| 17A | None | — | — | 0.216 | 0.095 | 426 | 5.5 |
| 17B | Heat Only | — | — | 0.225 | 0.13 | 210 | 1.0 |
| 17C | Heat, then Stretch | 1.25 × 1 | 87 | 0.218 | 0.19 | 116 | 1.3 |
| 17D | Stretch Only | 1.25 × 1 | 134 | 0.175 | 0.40 | 38 | 1.1 |
| 17E | Stretch Only | 1.25 × 1.25 | 134 | 0.165 | 0.47 | 49 | 4.2 |
| 17F | Stretch Only | 1.5 × 1 | 134 | 0.18 | 0.41 | 47 | 2.4 |

In the Table, Example 17A corresponds to a film as prepared in Example 2, Example 17B corresponds to a film as prepared in Example 3. For Example 17C, the film from Example 17B was cooled from 130° C. to room temperature prior to stretching, and then heated in the T. M. Long Co. stretcher to 93° C. before stretching. For Examples 17D, 17E, and 17F, a film prepared as in Example 2 was heated to the temperature shown in Table 7 in the T.M. Long Co. film stretcher and then stretched, without first heating to 130° C., as in the heat-only method.

In general, stretching increased bubble point, decreased the Gurley value and increased the resistivity relative to untreated film (Example 17A). While low resistivity is desirable, Examples 17C–17F demonstrate that gas flow through the film can be enhanced without unduly increasing resistivity. Example 17C showed that even a small amount of stretching of a film that had been previously heated at 130° C. (Example 17B) provided a significant increase in bubble point and a significant decrease in Gurley value while not significantly increasing the resistivity. Examples 17D–17F illustrate the effects of a single step process of stretching the film from Example 17A at a higher temperature than the melting point of the polymer. Stretching at higher temperature resulted in an even larger increase in bubble point and even larger decrease in Gurley value. The change in resistivity varied with the amount of stretching from almost no change (Example 17D) to a moderate change (Example 17E), and to a somewhat larger change (Example 17F). Advancing and receding contact angles (water) for the film were, respectively, (17D) 148°±6° and 95°±5°, (17E) 153°±4° and 98°±5°, and (17F) 156°±8° and 104°±4°. The results are unexpected, in that unfilled porous films heated at or near their melting point generally would collapse and become a dense, nonporous films. Polarization curves for Example 17 are given in FIG. 12.

As shown in Example 18 below, as little as 20 volume % carbon relative to the volume of HDPE in conjunction with a high loading of metallic particles is sufficient to hinder densification of the membrane upon heating at 130° C. The peak melting temperature of the HDPE was 126° C. as determined by DSC. Example 18 also shows that useful TIPT films can be prepared using conductive metal particles in conjunction with conductive carbon particles.

Example 18

TIPT Films Loaded with Non-Carbon Conductive Particles

Example 18A: A dispersion was prepared by wetting out 11,574 g of tungsten powder having a primary particle size of 0.5 μm (Teledyne Wah Chang, Huntsville, Ala.) in 2576 g of mineral oil (Superla™ White Mineral Oil No. 31) and 359 g of OLOA 1200 using a dispersator having a 2 in. sawtooth disc head (Premier Mill Corp.). The resultant mixture was then milled by recirculating this mixture through a 0.25 L horizontal mill (Premier Mill Corp.) that contained a 50 vol. % charge of 1.3 mm steel beads, for 2 hr. The resultant dispersion was then filtered through a 20 micron rope-wound filter that had been pre-wet with oil. An iterative series of density checks followed by oil additions was performed to adjust the density until the desired target density of 3.6358 was reached.

As described in Example 1, this dispersion was pumped at 59.6 mmin. into an intermediate zone of a 25 mm twin screw operated at 90 rpm and HDPE (grade GM 9255 from Hoechst Celanese Corp., now available as grade 1285 from Fina Oil & Chemical Co.) was gravimetrically metered into the extruder throat at 0.54 kg (1.2 lb)/hr. The film was cast onto a smooth casting wheel maintained at 32° C. at about 0.225 mm thick. The oil was extracted using three–15 min. washes of Vertrel 423™ and dried in an exhaust hood. The resultant film was evaluated after washing/drying and then after heating for 10 min. at 130° C., as shown in Table 8. The calculated weight percent of tungsten in the dried film was 95.0.

Example 18B: A membrane similar to Example 18A was prepared that had the same volume percent loading of particulate, 48.3 vol. %, except that the total particulate contained 73 volume % tungsten and 27 volume % conductive carbon. The total weight percent particulate in the final membrane was 93.5% of a 96.29/3.71 by weight mixture of tungsten and Conductex 975™ conductive carbon (Colombian Chemicals Co.).

The dispersion was prepared by combining 2400 g of mineral oil (0.863 g/cc) and 300 g of OLOA 1200 (0.92 g/cc). Then, 8880 g of tungsten (19.35 g/cc) was wetted out into this mixture using a dispersator equipped with a 2 in. sawtooth disc head (Premier Mill Corp.). A 341 g quantity of Conductex 975 (2.0 g/cc) was added in portions. Heating was commenced to lower the dispersion viscosity to facilitate wetting out of the carbon. The dispersion was then heated to 150° C. for 20 min. The hot dispersion was recirculated for one hour through a 0.25 L horizontal mill operated at 3500 rpm. The mill contained an 80 vol. % charge of 1.3 mm steel beads. The dispersion density was adjusted by adding more mineral oil until a final density of 2.8922 g/cc at 25° C. was reached.

As described in Example 1, the dispersion was pumped at 59.6 ml/min. into an intermediate zone of a 25 mm twin screw operated at 90 rpm and HDPE (grade GM 9255 from Hoechst Celanese Corp., now available as grade 1285 from Fina Oil & Chemical Co.) was gravimetrically metered into the extruder throat at 0.54 kg (1.2 lb)/hr. The film was cast onto a smooth casting wheel maintained at 32° C. at about 0.225 mm thick. The oil was extracted using three—15 min. washes of Vertrel 423™ and dried in an exhaust hood. The resultant film was evaluated after washing/drying and then after heating for 10 min. at 130° C., as shown in Table 8.

TABLE 8

| Example | Treatment | Caliper, mm | Bubble Point, μm | Gurley no., sec./50 cc | Resistivity, ohm-cm |
|---|---|---|---|---|---|
| 18A(1) | None | 0.24 | 0.27 | 135 | >10⁶ |
| 18A(2) | 130° C./10 min. | 0.163 | 0.071 | * | >10⁶ |
| 18B(1) | None | 0.173 | 0.10 | 317 | 101 |
| 18B(2) | 130° C./10 min. | 0.133 | 0.18 | 152 | 3.5 |

*Film broke in Gurley instrument

The data shown in Table 8 indicate that conductive particles other than carbon can be used to prepare TIPT films useful in the invention if at least a minor amount of conductive carbon is included in order to achieve acceptably low resistivity, decreased Gurley and increased bubble point on heating the film.

Examples 19–27

Carbon-Loaded Porous PTFE Membranes—PF Process

In examples 19–27, the carbon loaded Teflon® (PTFE) media was prepared using the general process taught, e.g., in U.S. Pat. No. 5,071,610, incorporated herein by reference. In brief, the porous, conducting Teflon® based membranes were prepared by hand mixing carbon particles, a liquid dispersant and PTFE powder to form a putty-like mass. The material then was passed multiple times through a heated mill (Model 4037, Reliable Rubber and Plastic Machinery Co. Inc., North Bergen, N.J.), with repeated folding and rotating of the sample and reductions of the mill gap in between passes through the mill. The final membrane sheet was then heated above the boiling point of the dispersant, in a vented oven, to remove the dispersant.

The dispersant used in all the examples was Fluorinert™, FC-40 (b.p.=155° C.) highly fluorinated electronic liquid, available from 3M Co., St. Paul, Minn. The use of a fluorinated dispersant in the PF process is described in U.S. Pat. No. 5,113,860, incorporated herein by reference.

The Teflon® binder, provided in dry form, was PTFE type 6-C, (DuPont Chemical Co., Wilmington, Del.). Carbon particles consisted of carbon black material and/or carbon fibers. The carbon black material is identified in each example.

Carbon fibers were obtained from Strem Chemicals Inc., Newburyport, Mass., catalog number 06-0140. The approximately 6 mm long×0.001 cm diameter fibers were received bundled randomly together and had to be physically dispersed prior to use. This was done by brushing the fiber bundles with a brass bristle brush to cause separated fibers to fall into a USA Standard Testing Sieve (W.S. Tyler Inc., Mentor, Ohio), then shaking on a sieve (100 mesh) shaker (W.S. Tyler Inc., Mentor, Ohio) for one hour. The individual carbon fibers then were blended with carbon black and added to the Teflon® and Fluorinert mixture.

In the following examples, the Gurley, resistance, contact angles and fuel cell performance of several carbon/PTFE composite membranes are compared to the ELAT™ PTFE/carbon material described in previous examples.

Example 19

PTFE/Carbon Black (95%) Membrane

Five grams of carbon black (Vulcan XC72R, Cabot Corp., Waltham, Mass., average particle diameter of 30 nm) were mixed with 0.263 g of PTFE and 40 g of Fluorinert™ FC-40. The mixture was hand-kneaded and formed as described above, into a porous, conducting membrane 0.38 mm thick. The membrane was dried in a vented oven at 180° C. for one hour. The resultant membrane, measuring approximately 37.5 cm×30 cm, was approximately 95% by weight carbon.

Figure 9:
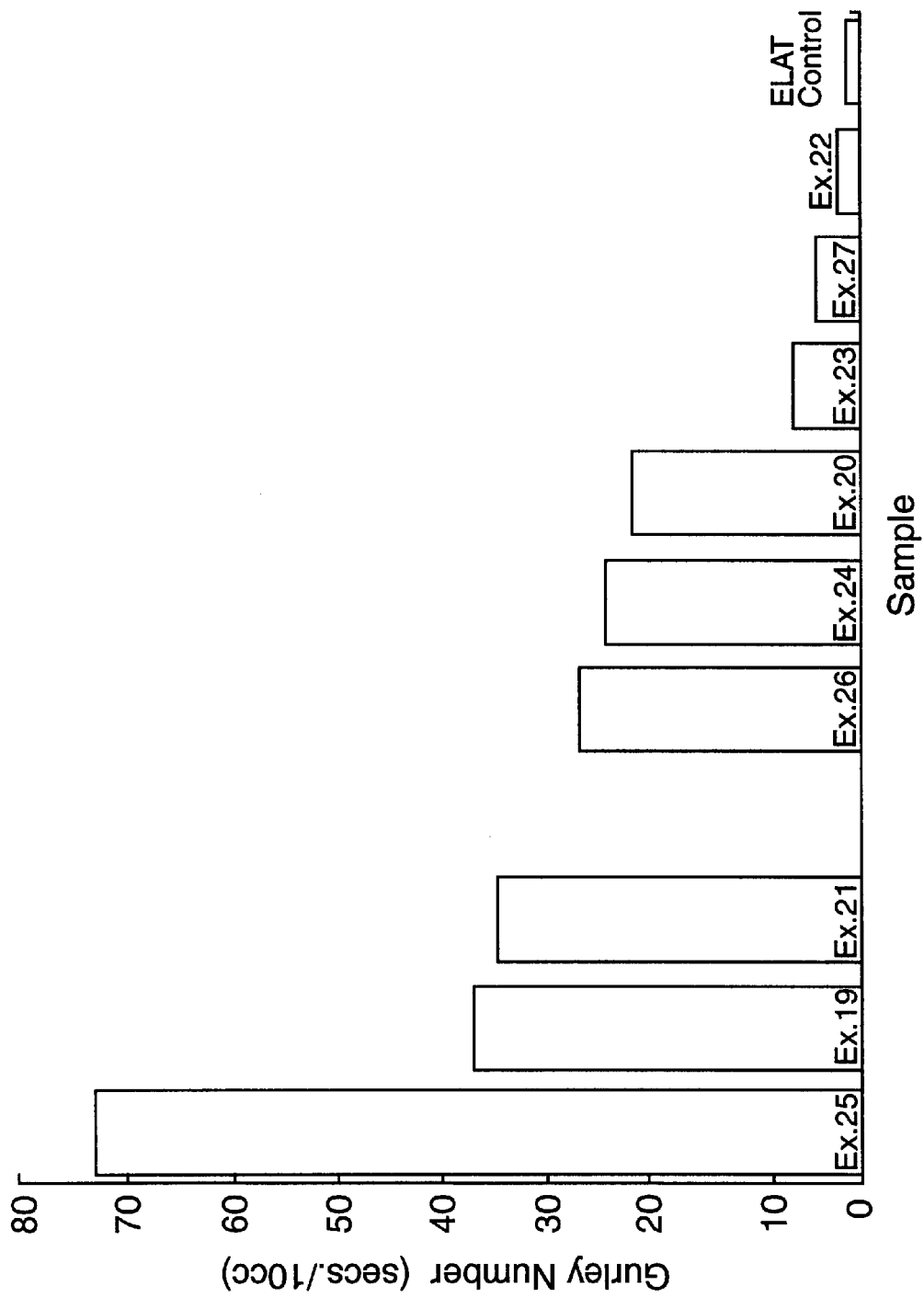
FIG. 9 is a bar graph showing the Gurley values for electrode backing layers produced using the PF process and, for comparison, commercial electrode backing material.

A Gurley value of 37 seconds per 10 cc was measured for the membrane (FIG. 9).

Example 20

Membrane Comprising PTFE and Carbon Black/Carbon Fiber (89/6) Mixture

A 4.7 gram portion of carbon black, type Vulcan XC72R, and 0.3 g of carbon fibers (Strem Chemicals Inc.) were mixed with 0.263 g of PTFE and 40 g of Fluorinert™ FC-40. The mixture was hand kneaded and formed into a porous, conducting membrane 0.38 mm thick. The membrane was dried in a vented oven at 160° C. for one hour. It was then folded in half and passed through the mill rolls to a thickness of 0.30 mm. The resultant membrane, measuring approximately 37.5 cm×30 cm, was approximately 95% by weight total carbon; 89% carbon black and 6% carbon fibers.

The measured Gurley was 21.5 seconds per 10 cc (FIG. 9). The resistance of two 5 cm² pieces of the membrane compressed to 0.51 cm thick, measured in the fuel cell test cell as described in Example 6, was 4.0 milliohms, compared to 5.7 milliohms for two similar sized pieces of ELAT™ reference material. (FIG. 10) This corresponds to a bulk resistivity of 0.94 ohm-cm.

Example 21

Membrane Comprising PTFE and Carbon Black/Carbon Particle Mixture

A 3.0 gram portion of Vulcan XC72R carbon black and 2.0 g of Norit SX1 carbon particles, average particle size of 32–75 μm (American Norit Co. Inc., Atlanta, Ga.) were mixed with 0.263 g of PTFE and 40 g of Fluorinert™ FC-40. The mixture was hand kneaded and formed into a porous, conducting membrane 0.36 mm thick, as described above. The membrane was dried in a vented oven. The resultant membrane was approximately 95% by weight total carbon; 57% carbon black and 38% carbon particles.

Figure 10:
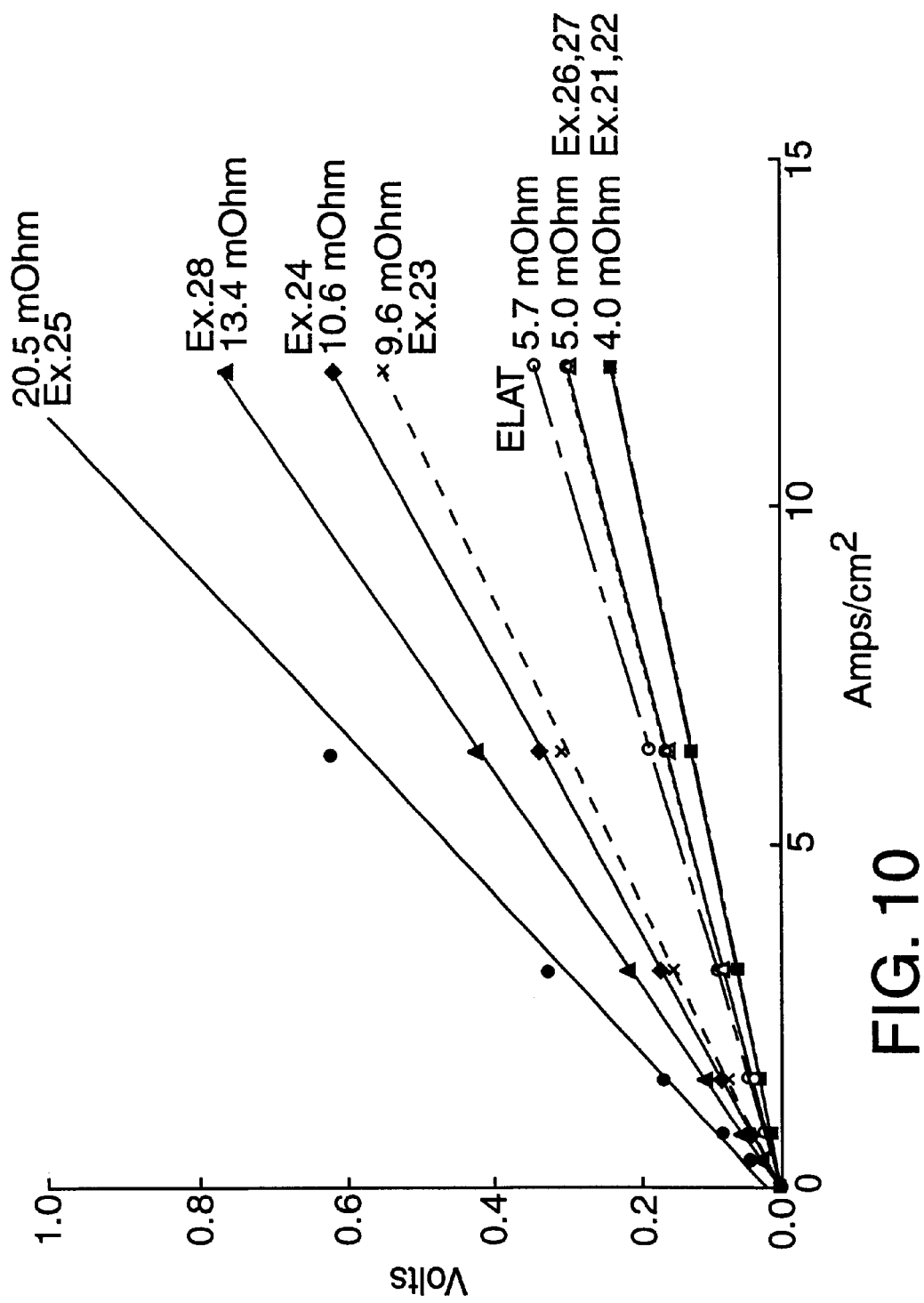
FIG. 10 is a graph of the applied voltage as a function of current density for electrode backing layers produced using the PF process and a commercial electrode backing material, as measured in a fuel cell test assembly.

The measured Gurley was 35 seconds per 10 cc (FIG. 9). The resistance of two 5 cm² pieces of the membrane compressed to 0.076 cm thick was 4.0 milliohms (FIG. 10). This corresponds to a bulk resistivity of 0.26 ohm-cm. The advancing and receding contact angles were measured to be 153°±4° and 113.7°±1.6°, respectively.

Figure 11:
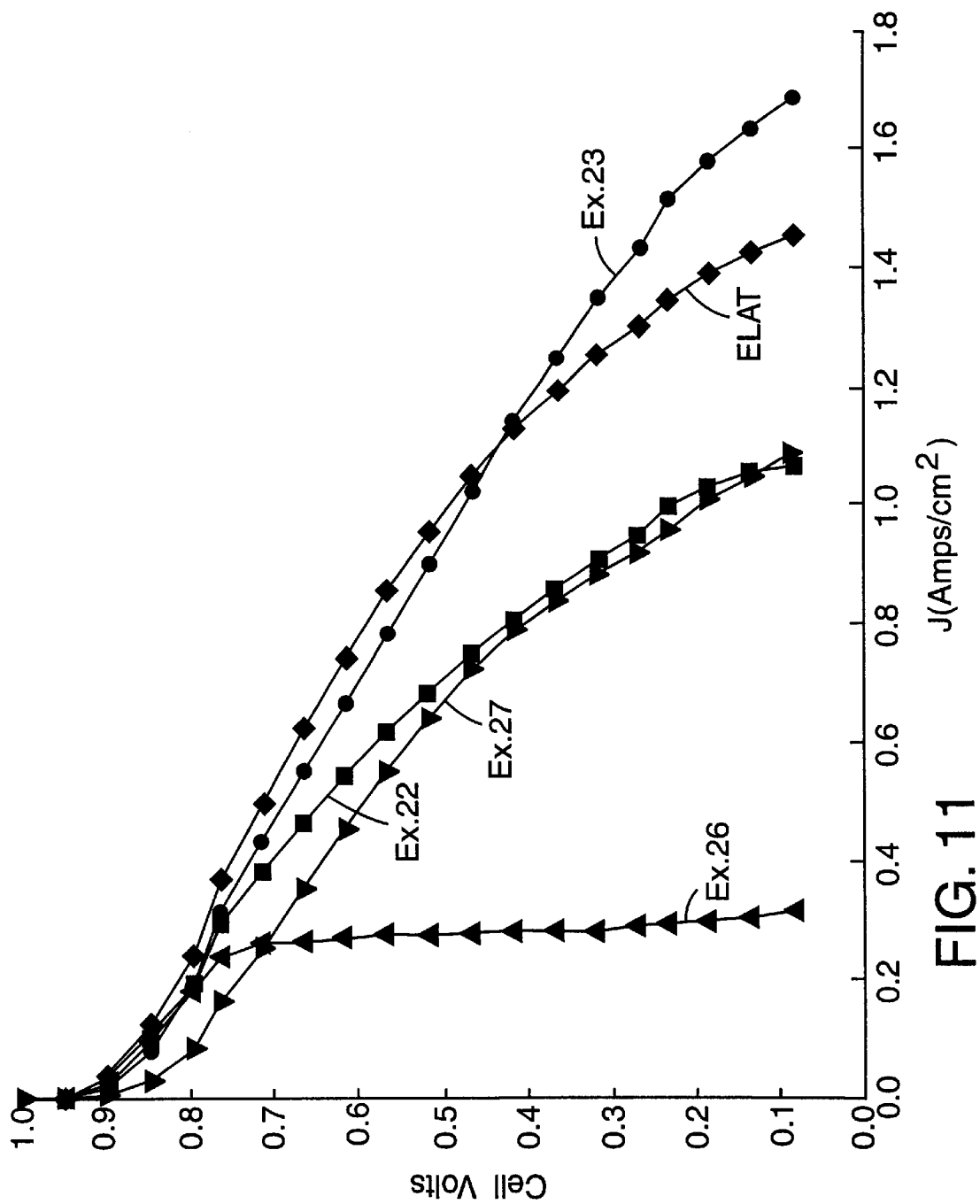
FIG. 11 is a graph of cell voltage versus current density for fuel cell MEA's incorporating electrode backing layers produced using the PF process compared to a fuel cell MEA produced with a commercial electrode backing layer.

For examples 22, 23, 26 and 27, the same catalyst coated ion conducting membrane was used to obtain the fuel cell polarization curves for the different electrode backing material samples. The testing was done by opening the cell after the completion of one test, removing the electrode backing layer, and replacing them with the next electrode backing layer. In FIG. 11 the order in which the samples were tested by reference to the particular example was: Example 22, Example 23, Example 26, Example 27 followed by the ELAT control. Since the full performance of the catalyzed Nafion 115 ion conduction membrane was obtained with the last sample using the ELAT control, interchanging the electrode backing layers did not damage the catalyzed membrane. As seen from the resistance and Gurley measurements for these examples in FIGS. 9 and 10, the significant differences in fuel cell performance cannot be due to resistance or just porosity. The current limited performance of the sample from Example 26, due to oxygen limited diffusion through a cathode water flooding layer, is most likely associated with the lower porosity (higher Gurley value) and much lower receding contact angle (107.5°) compared to the other examples in the series. These examples demonstrate that the wetting characteristics of the type of carbon particle used is very important since it influences the receding contact angle.

Example 22

Membrane Comprising PTFE and Carbon Black/ Carbon Fibers (87/8)

A 4.6 gram portion of Vulcan XC72R carbon black and 0.4 g of carbon fibers (Strem Chemicals Inc.) was mixed with 0.263 g of PTFE and 40 g of Fluoriner™ FC-40. The mixture was hand kneaded and formed into a porous, conducting membrane 0.28 mm thick. The membrane was dried in a vented oven at 165° C. for two hours. The resultant membrane was approximately 95% by weight total carbon, 87% carbon black and approximately 8% carbon fibers.

The measured Gurley was 2.1 seconds per 10 cc (FIG. 9). The resistance of two 5 cm$^2$ pieces of the membrane compressed to 0.058 cm thick was 9.6 milliohms (FIG. 10). This corresponds to a bulk resistivity of 0.82 ohm-cm. The advancing and receding contact angles were respectively measured to be 154±7° and 132°±4°.

The fuel cell performance of the electrode backing layers prepared in this example was measured using a Nafion™ 115 membrane-based 3-layer MEA with nanostructured electrodes, as described in Example 9. FIG. 11 shows the performance of this and other 5-layer MEAs of the invention, as well as that of electrode backing layers prepared from ELAT™ reference material. The current density of membranes of this Example at 0.5 volts is seen to be 0.7 A/cm$^2$. To obtain the fuel cell polarization curves in FIG. 11, the fuel cell was operated at a temperature of 80° C. with a hydrogen pressure of 207 Kpa, an oxygen pressure of 414 Kpa, and flow rates of 1 standard liter per minute, and the anode/cathode humidification temperatures were 115° C. and 80° C., respectively.

Example 23

Membrane Comprising PTFE and Carbon Black/ Carbon Fiber (78/7)

A 4.6 gram portion of Shawinigan C-55 carbon black, and 0.4 g of carbon fibers (Strem Chemicals Inc.) was mixed with 0.90 g of PTFE and 45 g of Fluorinert™ FC-40. The mixture was hand kneaded and formed into a porous, conducting membrane 0.41 mm thick. After drying in a vented oven, the resultant membrane was approximately 85% by weight carbon; 78% carbon black and approximately 7% carbon fibers.

The measured Gurley was 6.2 seconds per 10 cc (FIG. 9). The resistance of two 5 cm$^2$ pieces 0.058 cm thick of the membrane was 10.6 milliohms (FIG. 10). This corresponds to a bulk resistivity of 0.90 ohm-cm. The advancing and receding contact angles were respectively measured to be 157±5° and 137°±9°.

The fuel cell performance of the electrode backing layers prepared in this example was measured as described above. The current density at 0.5 volts was 0.95 A/cm$^2$.

Example 24

Membrane Comprising PTFE and Carbon Black (92%)

This membrane was prepared as described in Example 19, except the total carbon loading was 92% by weight Vulcan XC72R. The membrane thickness was 0.25 mm.

The measured Gurley was 24 seconds per 10 cc (FIG. 9), and the membrane resistance was 20.5 milliohms (FIG. 10). This corresponds to a bulk resistivity of 1.92 ohm-cm. The advancing and receding contact angles were respectively measured to be. 156±8° and 96±5°.

Example 25

Membrane Comprising PTFE and Carbon Black (95%)

This membrane was prepared with the same ingredients as in Example 19 except a different thickness membrane was formed. The resultant membrane was approximately 95% by weight carbon black and 0.32 mm thick.

The measured Gurley was 73 seconds per 10 cc (FIG. 9), and the membrane resistance was 5.0 milliohms (FIG. 10), giving a bulk resistivity of 0.39 ohm-cm.

Example 26

Membrane Comprising PTFE and Carbon Black (90%)

A 90 wt % carbon-containing membrane was prepared as described in Example 19 using Ketjen-600J carbon black. The porous, conducting membrane was 0.28 mm thick.

The measured Gurley was 27 seconds per 10 cc (FIG. 9), and the resistance of two 5 cm$^2$ pieces of the membrane was 5.0 milliohms (FIG. 10), for a bulk resistivity of 0.48 ohm-cm. The advancing and receding contact angles were respectively measured to be 161±8.5° and 107.5±5°.

The fuel cell performance of the electrode backing layers prepared in this example was measured as described above and shown in FIG. 11. The current density at 0.5 volts was 0.28 A/cm$^2$.

Example 27

Membrane Comprising PTFE and Carbon Black (85%)

An 85 wt % carbon-containing membrane was prepared as described in Example 19 using Shawingian C-55 carbon black. The porous, conducting membrane was 0.39 mm thick.

The measured Gurley was 4.4 seconds per 10 cc (FIG. 9), and the resistance of two 5 cm$^2$ pieces of the membrane was 13.4 milliohms (FIG. 10), for a bulk resistivity of 0.88 ohm-cm. The advancing and receding contact angles were respectively measured to be 157±7° and 141±12°.

The fuel cell performance of the electrode backing layers prepared in this example was measured as described above and shown in FIG. 11.

Example 28

Effect of TIPT Film Asymmetry

Figure 13:
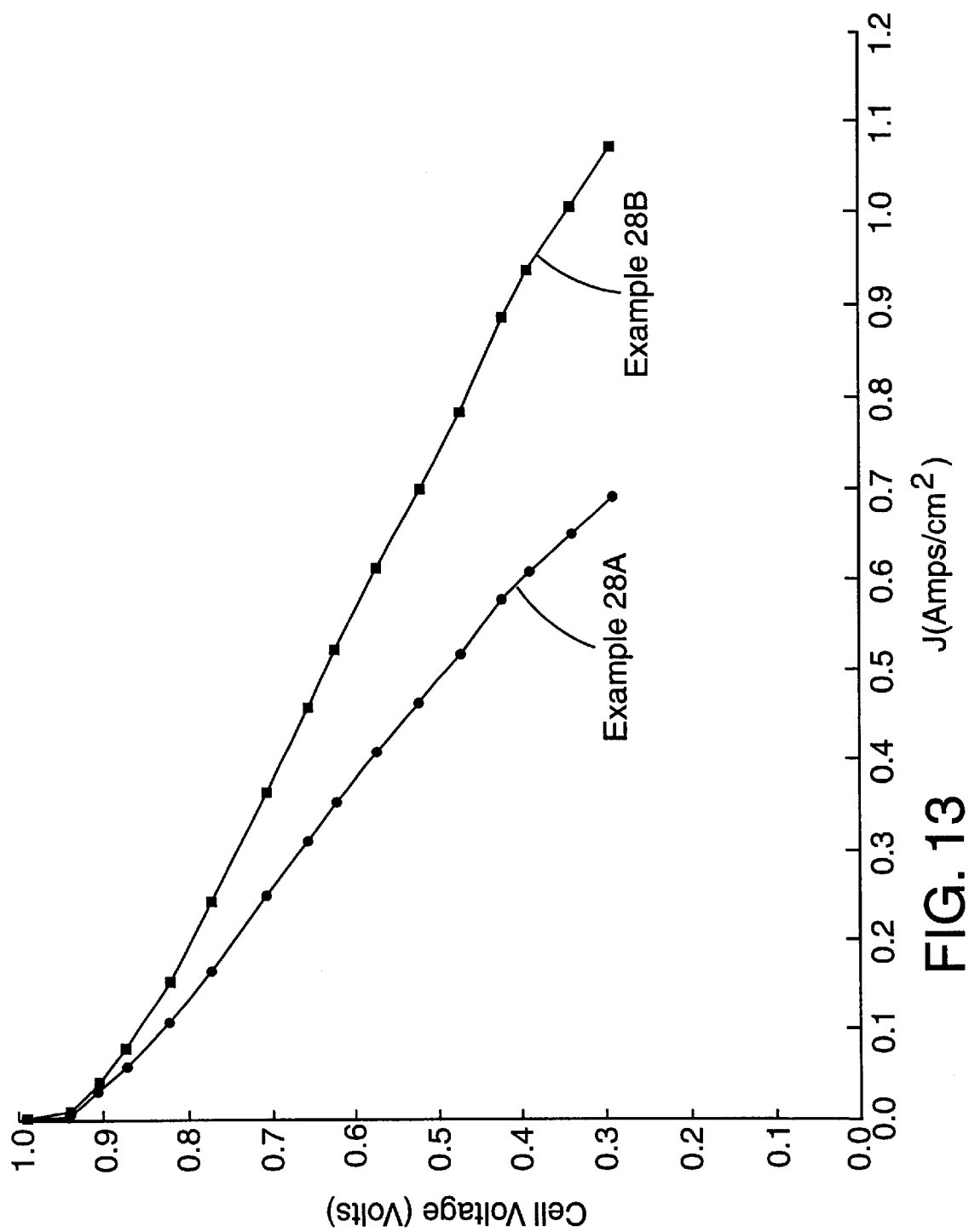
FIG. 13 is a graph of cell voltage versus current density for fuel cells incorporating electrode backing layers produced using the TIPT process using a smooth casting wheel showing the difference in cell performance for an asymmetric electrode backing layer in the cell depending on the orientation of the electrode backing film with respect to side-to-side placement in the cell.
Figure 16A:
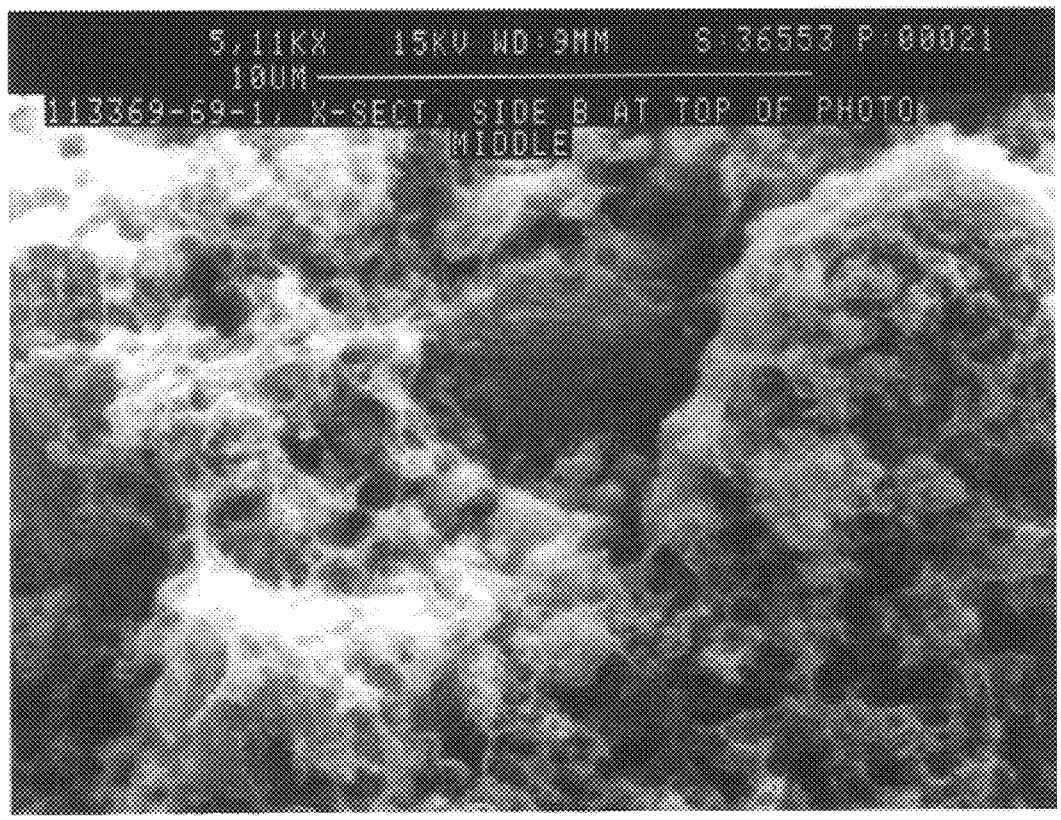
FIG. 16A is a SEM micrograph of a cross-section of the carbon-filled UHMWPE film of Example 14 before heat treatment.
Figure 16B:
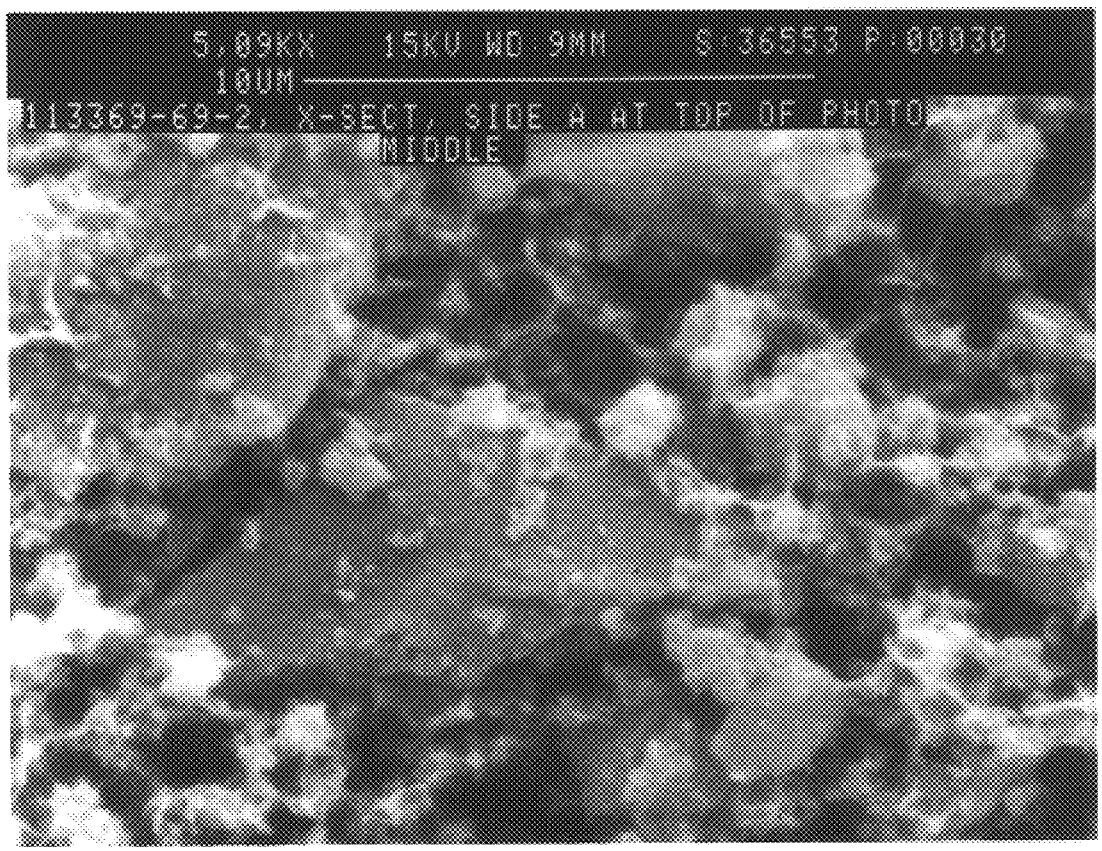
FIG. 16B is a SEM micrograph of a cross-section of the carbon-filled UHMWPE film of Example 14 after heat treatment.

The carbon-filled HDPE membrane described in example 16B (heat treated) was evaluated in a fuel cell under the same conditions as described above with respect to Examples 9–14 except that Nafion™ 115 was used for the ion conduction membrane and the electrode backing layers were extracted with Vertrel 423. In Example 28A the film was placed with the side of the film that was against a smooth casting wheel during quenching facing away from the catalyzed membrane. In Example 28B the same film was placed with the casting wheel side of the film facing towards the catalyzed membrane. SEM photomicrographs of the casting wheel and air sides of film from 16B are shown in FIG. 15, with comparable films without heat treatment shown in FIG. 14. The fuel cell results are presented in FIG. 13. The results show significantly better performance for Example 28B with the casting wheel side of the film placed against the catalyzed membrane. As evident from the SEM results in FIG. 15, the better results are obtained with the film layer next to the catalyzed membrane having smaller pores and a denser surface layer. FIG. 16 shows SEM micrographs for UHMWPE films corresponding to Example 14 with and without heat treatment.

The embodiments described above are intended to be representative and not limiting. Additional embodiments of the invention are within the claims.

What is claimed is:

1. A polymer web comprising a plurality of MEA elements: wherein a region of said polymer web adjacent to an electrode contains one or more holes.

2. The polymer web of claim 1, wherein said MEA elements are disposed along a continuous web of ion conducting polymeric material.

3. The polymer web of claim 2, further comprising seal material.

4. The polymer web of claim 1, further comprising nanostructured catalyst layers.

* * * * *

UNITED STATES PATENT AND TRADEMARK OFFICE
CERTIFICATE OF CORRECTION

PATENT NO. : 6,432,571 B1
DATED : August 13, 2002
INVENTOR(S) : Debe, Mark K.

It is certified that error appears in the above-identified patent and that said Letters Patent is hereby corrected as shown below:

Title page,
Item [56], References Cited, U.S. PATENT DOCUMENTS, add:
-- 5,190,378     6/1999        Debe et al.
   6,197,147    3/2001         Bonsel et al. --
FOREIGN PATENT DOCUMENTS, add:
-- WO 97/23919       7/1997         Bonsel et al. --

Column 2,
Line 34, "thereof The is" should be -- thereof. The --

Column 3,
Line 26, "20° degrees C" should be -- 20° C --
Line 30, "The NEA" should be -- The MEA --

Column 7,
Line 32, "XC72RT™" should be -- XC72R™ --
Line 38, "Super ST™" should be Super S™ --

Column 8,
Line 17, "advancing-contact" should be -- advancing contact --

Column 9,
Line 3, "terethphalate" should be -- terephthalate --
Line 43, "two of more" should be -- two or more --

Column 10,
Line 18, "thermoplastic. polymer" should be -- thermoplastic polymer --
Line 62, "an-alternative" should be -- an alternative --

Column 11,
Line 37; "diluen/UHMWPE " should be -- diluent/UHMWPE --

Column 13,
Line 56, "article" should be -- particle --

Column 14,
Line 51, "increasing" should be -- increasingly --
Line 59, "Asymetric" should be -- Asymmetric --

UNITED STATES PATENT AND TRADEMARK OFFICE
CERTIFICATE OF CORRECTION

PATENT NO.    : 6,432,571 B1
DATED         : August 13, 2002
INVENTOR(S)   : Debe, Mark K.

It is certified that error appears in the above-identified patent and that said Letters Patent is hereby corrected as shown below:

Column 15,
Line 12; "Teflon 30$^{TM}$" should be -- Teflon 30b$^{TM}$ --
Line 23, "ad miscible" should be -- and miscible --
Line 31, "Flourinert$^{TM}$" should be -- Fluorinert$^{TM}$ --

Column 16,
Line 26; "article" should be -- particle --
Line 37, "usefull" should be -- useful --
Line 37, "values" should be -- value --
Line 40, "article" should be -- particle --

Column 17,
Line 7, "Mogul" should be -- Mogul$^{TM}$ --
Line 10, "AHing-Lander" should be -- Alling-Lander --
Line 17, "125º" should be -- 125º C --
Line 44, "0.25. to" should be -- 0.25 to --

Column 18,
Line 24, "porousity" should be -- porosity --
Lines 48-49, "extremum" should be -- extreme --

Column 21,
Line 8, "NEA" should be -- MEA --
Line 31, "NMA" should be -- MEA --

Column 23,
Line 36, "Naflon" should be -- Nafion --

Column 24,
Line 2, "mil" should be -- mill --
Line 33, "sln" should be -- slm --

Column 25,
Line 52, "1580 and 1070" should be -- 158º and 107º --
Line 62, "was hung" should be -- were hung --

UNITED STATES PATENT AND TRADEMARK OFFICE
CERTIFICATE OF CORRECTION

PATENT NO. : 6,432,571 B1
DATED : August 13, 2002
INVENTOR(S) : Debe, Mark K.

It is certified that error appears in the above-identified patent and that said Letters Patent is hereby corrected as shown below:

Column 26,
Table 1, line 8, Column Extraction Solvent, "V1" should be -- $V^1$ --
Table 1, line 9, Column Extraction Solvent, "T/X2" should be -- $T/X^2$ --

Column 27,
Line 14, "5 cm. Two 5 cm2" should be -- 5 $cm^2$. Two 5 $cm^2$ --
Line 49, "commerically" should be -- commercially --

Column 29,
Line 52, "Rheocord-$^{TM}$" should be -- Rheocord$^{TM}$ --

Column 34,
Line 23, "59.6 mmin" should be -- 59.6 ml/min --

Column 35,
Line 38, "Flouriner$^{TM}$" should be -- Fluorinet$^{TM}$ --

Column 37,
Line 16, "Flouriner$^{TM}$" should be -- Fluorinet$^{TM}$ --

Column 38,
Line 5, "to be." should be -- to be --
Line 25, "Ketjen" should be -- KetJen --
Line 43, "Shawingian" should be -- Shawinigan --

Signed and Sealed this

Twenty-first Day of September, 2004

JON W. DUDAS
*Director of the United States Patent and Trademark Office*